United States Patent [19]
Murata

[11] Patent Number: 5,477,346
[45] Date of Patent: Dec. 19, 1995

[54] DIGITAL COLOR COPYING MACHINE FOR REPRODUCING IMPROVED BLACK CHARACTERS WITH ONLY BLACK TONER

[75] Inventor: Kazuyuki Murata, Kyoto, Japan

[73] Assignee: Matsushita Electric Industrial Co., Ltd., Osaka, Japan

[21] Appl. No.: 334,040

[22] Filed: Nov. 2, 1994

Related U.S. Application Data

[62] Division of Ser. No. 248,553, May 24, 1994, Pat. No. 5,392,139, which is a continuation of Ser. No. 636,918, Dec. 31, 1990, abandoned.

[30] Foreign Application Priority Data

| Dec. 29, 1989 | [JP] | Japan | 1-340666 |
| May 24, 1990 | [JP] | Japan | 2-135045 |
| Jun. 5, 1990 | [JP] | Japan | 2-148228 |

[51] Int. Cl.$^6$ ............................. H04N 1/40; H04N 1/409
[52] U.S. Cl. ................... 358/529; 358/530; 358/532; 382/266
[58] Field of Search ................. 358/447, 448, 358/461, 463, 518, 521, 523, 532, 529, 530, 537, 538, 452, 453, 501; 382/22, 47, 54, 162, 167, 266; H04N 1/40

[56] References Cited

U.S. PATENT DOCUMENTS

| 4,591,923 | 5/1986 | Urabe et al. |  |
| 4,953,013 | 8/1990 | Tsuji et al. |  |
| 5,031,034 | 7/1991 | Shimizu et al. | 358/529 |
| 5,086,484 | 2/1992 | Katayama et al. |  |
| 5,311,328 | 5/1994 | Murata | 358/518 |
| 5,357,353 | 10/1994 | Hirota | 358/530 |
| 5,357,354 | 10/1994 | Matsunawa et al. | 358/518 |

FOREIGN PATENT DOCUMENTS

| 50-14124 | 2/1975 | Japan |
| 53-11328 | 3/1978 | Japan |
| 62-183672 | 8/1987 | Japan |
| 64-41377 | 2/1989 | Japan |

Primary Examiner—Scott A. Rogers
Assistant Examiner—Kim Yen Vu
Attorney, Agent, or Firm—Wenderoth, Lind & Ponack

[57] ABSTRACT

A digital color copying machine improves the quality of an image of black characters by reproducing them with only black toner and prevents the edges of each black character from being colored with a color. The machine includes a monochromatic signal generator for generating a monochromatic signal in response to inputted plural color signals and an edge emphasizer for emphasizing edge components of the color signals with a predetermined edge emphasis amount. Either a digitizer for digitizing the monochromatic signal and outputting a binary signal of the monochromatic signal or a pseudo digitizer for generating a pseudo binary signal by steepening the contrast of the monochromatic signal is provided. A first area detector, second area detector, and third area detector are respectively provided for detecting first through third image areas. A first reproducer, second reproducer, and third reproducer are respectively provided for reproducing, in response to the binary signal, the color document image included in the first through third image areas detected by the first through third area detectors. A zoomer may be provided along with the pseudo digitizer, these zoomer performing a zooming process for the edge emphasis image signal with a predetermined zooming ratio such that the pseudo digitizer generates a pseudo binary signal by steepening the contrast of the monochromatic signal with a contrast conversion characteristic determined according to the zooming ratio.

15 Claims, 30 Drawing Sheets

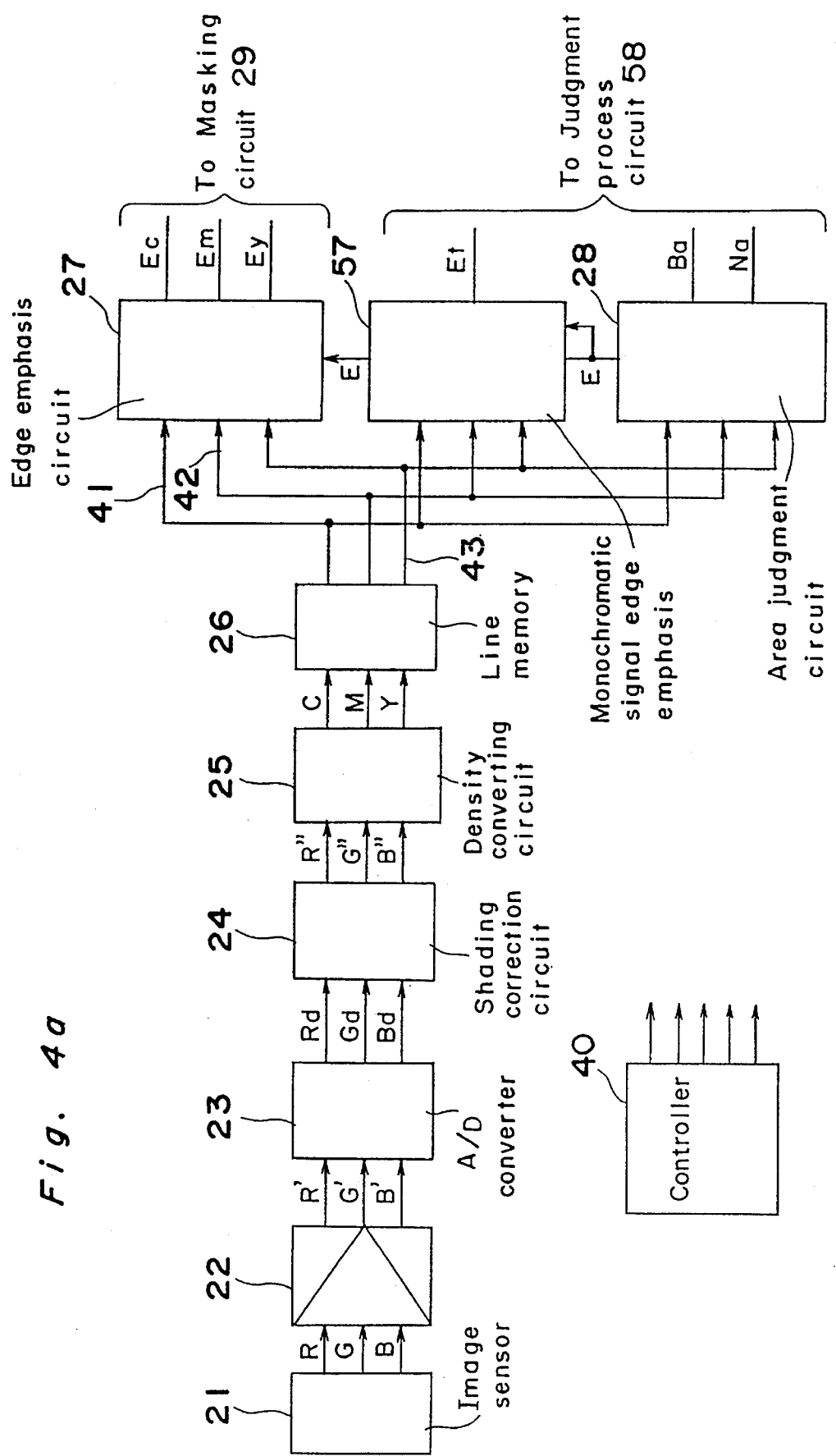

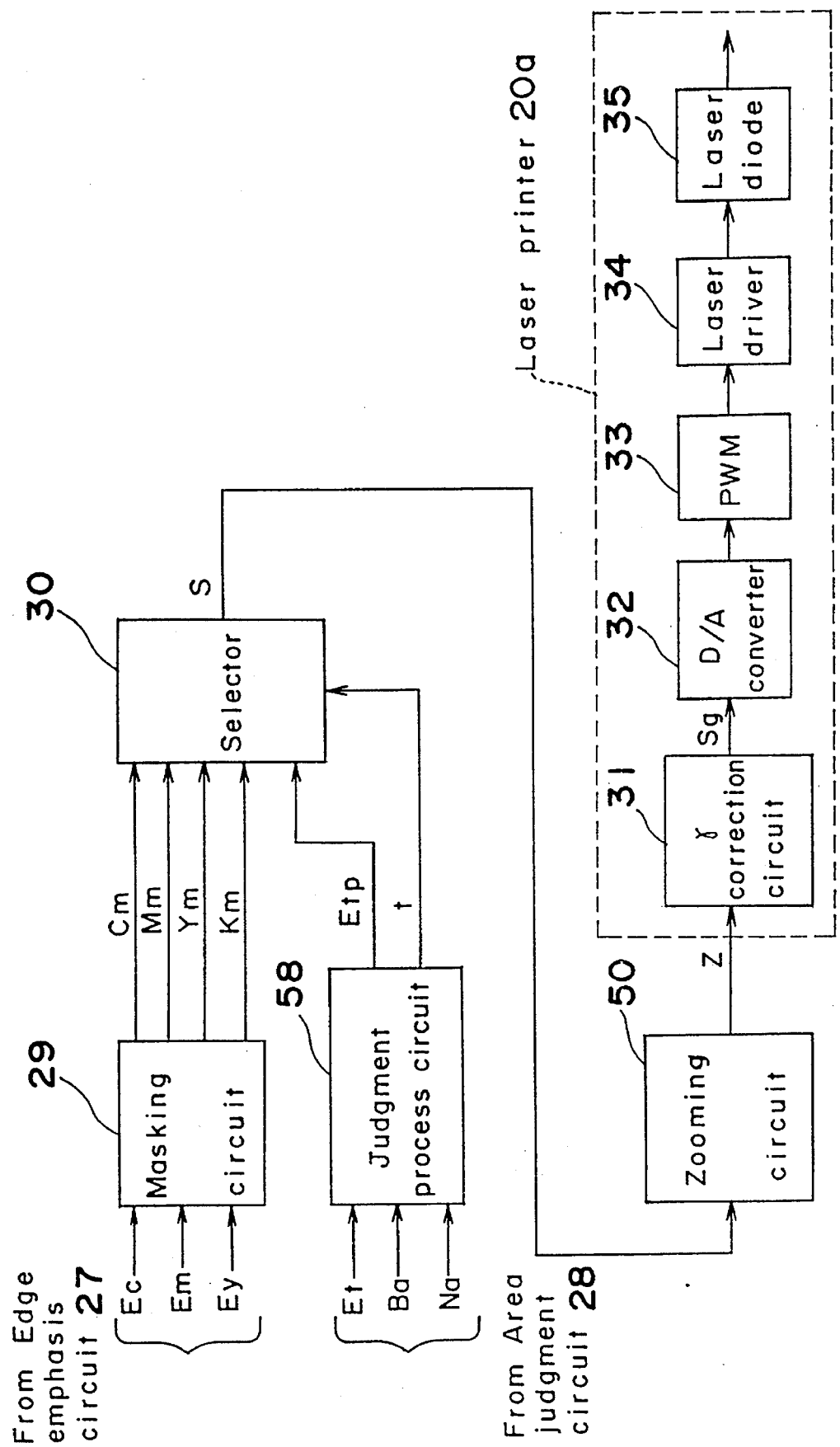

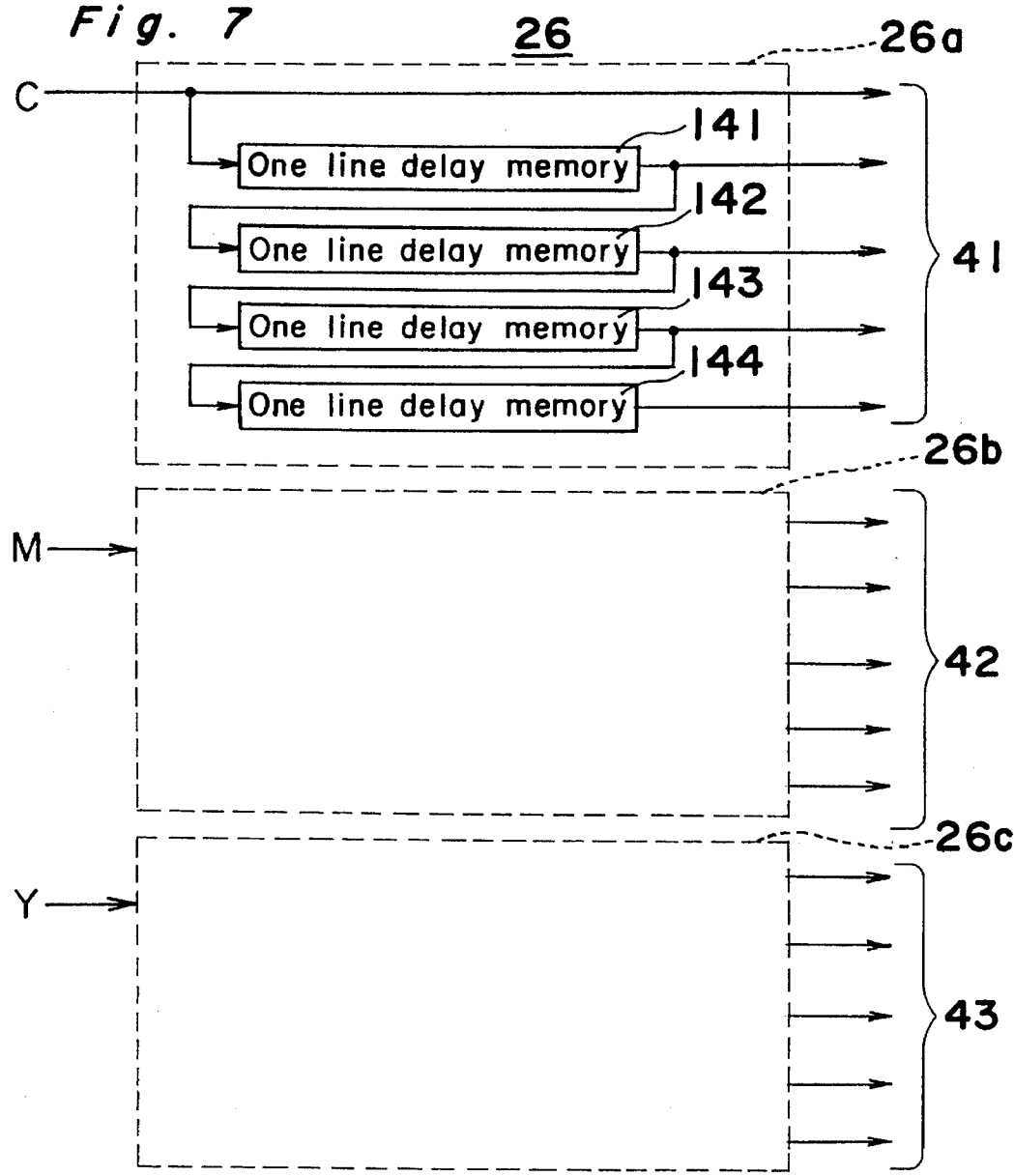
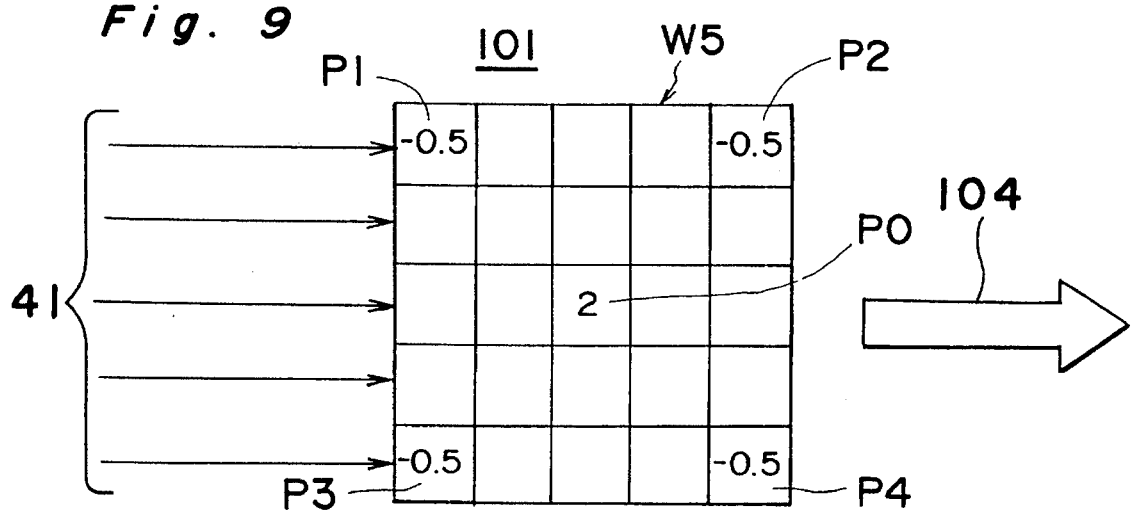

Fig. 16

| E | I4 | I3 | I2 | I1 | Selected |
|---|----|----|----|----|----------|
| H | L  | L  | L  | L  | i4 |
| H | H  | H  | H  | L  | i1 |
| H | H  | H  | L  | L  | i2 |
| H | H  | L  | L  | L  | i3 |
| H | H  | H  | H  | H  | i0 |
| L | X  | L  | L  | L  | i3 |
| L | X  | H  | H  | L  | i1 |
| L | X  | H  | L  | L  | i2 |
| L | X  | H  | H  | H  | i0 |

(Notes) H : HI
L : LOW
X : don't care

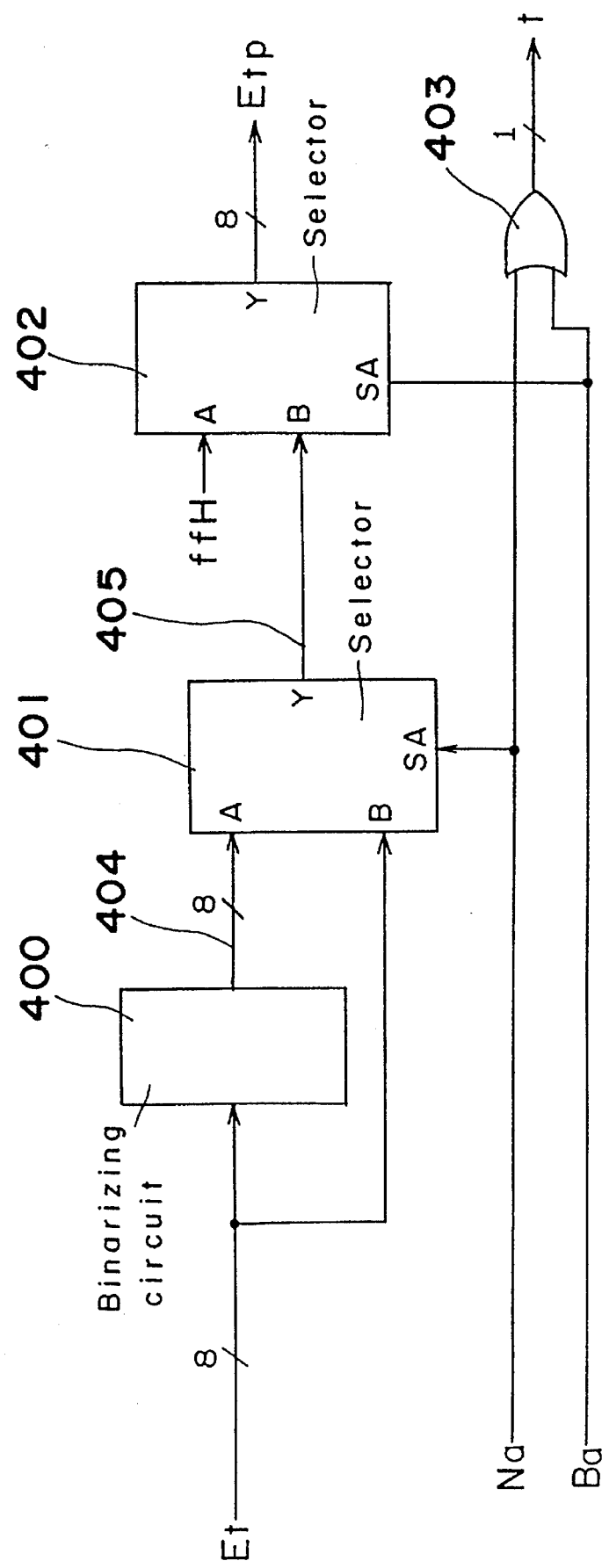

DIGITAL COLOR COPYING MACHINE FOR REPRODUCING IMPROVED BLACK CHARACTERS WITH ONLY BLACK TONER

This is a divisional of application Ser. No. 08/248,553, filed May 24, 1994, now U.S. Pat. No. 5,392,139, which is in turn a continuation of abandoned application Ser. No. 07/636,918, filed Dec. 31, 1990.

BACKGROUND OF THE INVENTION

1. Field of the Invention

The present invention relates to an image processing apparatus for performing an edge correction process which is applicable to a digital color copying machine, a color facsimile apparatus, an image filing system, and to a digital copying machine comprising the image processing apparatus therefor. More particularly, the present invention relates to an image processing apparatus for performing an edge correction process for image signals of respective pixels sequentially inputted, such as an edge emphasis process, and a digital copying machine for reproducing an image of a color document on a recording medium after reading the image of the color document and converting the read image into image signals, the digital copying machine comprising the image processing apparatus therefor.

2. Description of the Related Art

Recently, in an image processing apparatus such as a digital copying machine, it has been required to have various kinds of excellent functions. As these excellent functions for the image processing apparatus, for example, there have been provided a process for properly correcting an edge amount of an image signal converted by reading an image using an image reader, and also an edge emphasis process for increasing an edge emphasis amount of each edge included in an image such as a document including a map.

Documents to be copied using a digital copying machine often include a combination of black characters and a half-tone photograph. When copying a document of this combination, it is required to reproduce black characters having sharper edges without coloring them, and also it is required to reproduce a half-tone photograph with a better color reproduction characteristic or a better gradation characteristic which changes smoothly. In order to perform these processes, it is necessary to provide an area judgment process for certainly judging areas including black characters.

One example of a conventional edge emphasis process of a digital copying machine will be described below with reference to FIGS. 1 and 2.

FIG. 1 is a schematic block diagram showing a signal processing section of a conventional digital copying machine, and FIG. 2 shows a method for performing an edge emphasis process which is used in a conventional edge emphasis circuit 8 shown in FIG. 1.

Referring to FIG. 1, a document 1 is illuminated by an illumination lamp (not shown), and light including an image of the document 1 (referred to as a document image hereinafter) reflected from the document 1 is incident onto a CCD image sensor 3 through a focus lens 2. The CCD image sensor 3 converts the document image into an image signal including density information of the document image, and outputs the converted image signal through an amplifier 4 to an analogue to digital converter (referred to as an A/D converter hereinafter) 5, which converts the amplified analogue image signal into a digital image signal and outputs it to an edge emphasis judgment circuit 7 through a shading correction circuit 6.

The edge emphasis judgment circuit 7 judges whether or not an edge emphasis process is to be performed for the inputted digital image signal. If it is judged that the edge emphasis process is to be performed, the edge emphasis judgment circuit 7 outputs the inputted digital image signal to the edge emphasis circuit 8. On the other hand, if it is judged that the edge emphasis process is not to be performed, the edge emphasis judgment circuit 7 outputs the inputted digital image signal to an image processing circuit 9. In the judgment of the edge emphasis judgment circuit 7, when an absolute value of a difference between a density of a specified pixel and a density of each of plural peripheral pixels located within an area at a predetermined distance from the specified pixel is larger than a predetermined threshold value, it is judged that the edge emphasis process is to be performed. On the other hand, when the above absolute value is equal to or smaller than the above predetermined threshold value, it is judged that the edge emphasis process is not to be performed.

Further, the image processing circuit 9 performs an image process including a γ correction process for the digital signal inputted from the edge emphasis judgment circuit 7 or the edge emphasis circuit 8, and outputs the processed image signal to a digital to analogue converter (referred to as a D/A converter hereinafter) 10 of a laser printer 20.

The laser printer 20 comprises the D/A converter 10, a laser modulator 11, a laser driver 12 and a laser diode 13 which are well known to those skilled in the art. The laser printer 20 reproduces the document image of the document 1 on a piece of copying paper in response to the digital image signal inputted from the image process circuit 9.

FIG. 2 is a schematic diagram showing a method for performing an edge emphasis process which is used in the conventional edge emphasis circuit 8 shown in FIG. 1. It is to be noted that the conventional edge emphasis process is disclosed in the Japanese patent laid-open publication (JP-A) No. 62-183672/1987.

Referring to FIG. 2, a specified pixel P0 is positioned in the center of a pixel window W3 composed of 3×3 pixels in a matrix form (referred to as a 3×3 pixel window W3 hereinafter). Four peripheral pixels P1 to P4 are positioned at the four corners of the pixel window W3. In the edge emphasis process, as shown in FIG. 2, the sum of the densities of the four peripheral pixels P1 to P4 is subtracted from the density of the specified pixel P0 multiplied by five so as to obtain an image signal for which the edge emphasis process has been performed. Namely, a secondary differential value of the density of the specified pixel P0 obtained by differentiating the density of the specified pixel P0 twice with respect to positions in a main scan direction and a subscan direction is subtracted from the density of the specified pixel P0, resulting in an image signal for which the edge emphasis process is performed.

In the edge emphasis process described above, there can be obtained such an effect that a noise included in the image signal is suppressed by the edge emphasis process. However, since there is a discontinuity between respective edge emphasis amounts of a pixel for which the edge emphasis process has been performed and a pixel for which it has not been performed, the reproduced image becomes an unnatural image.

Further, since the emphasis amount of the edge emphasis process is obtained by adding the above-mentioned secondary differential value calculated using fixed coefficients to the density of the specified pixel P0, there is such a disadvantage that the edge emphasis amount can not be freely changed. Furthermore, when the above-mentioned conventional edge emphasis process is performed for a color signal composed of color-dissolved signals of respective colors such as R, G and B signals, there is such a problem that the color of the image signal becomes an achromatic color if the level of the image signal is depart from a dynamic range of the image signal which is predetermined in the image processing apparatus.

One example of a conventional area judgment circuit used in a digital copying machine will be described below with reference to FIG. 3 which is a schematic block diagram of the conventional area judgment circuit. It is to be noted that the conventional area judgment circuit is disclosed in the Japanese patent laid-open publication (JP-A) No. 64-41377/1989.

Referring to FIG. 3, color signals R, G and B obtained by reading a document scanning it are inputted in parallel to a filtering process circuit 601 for a half-tone image, a filtering process circuit 602 for filtering a binary image and an area judgment circuit 610. The filtering circuit 601 is constituted by a two dimensional filter for performing a band emphasis process on the basis of such an assumption that the specified pixel is located in an area of a half-tone image. The frequency characteristic of the two dimensional filter is preset so that components of mesh points are rejected and the sharpness of the reproduced image is heightened. The filtering circuit 602 performs an edge emphasis process for edge components such as characters on the basis of such an assumption that the specified pixel is located in an area of a binary image. The binarizing circuit 603 binarizes the color signals R, G and B using respective predetermined threshold values, respectively, only when hue signals r1, g1 and b1 become a high level. On the other hand, when the hue signals r1, g1 and b1 become a low level, the binarizing circuit 602 outputs the color signals R, G and B as they are.

One set of color signals is selected by a selector 604 among a set of color signals filtered by the filtering circuit 601 and a set of color signals outputted from the binarizing circuit 603 according to an area judgment signal outputted from the area judgment circuit 610 which is described in detail later, and the selected set of color signals are outputted through a color correction and under color removal (referred to as a UCR hereinafter) circuit 611 to an image processing circuit of the next stage.

The area judgment circuit 610 comprises a hue judgment circuit 605, a ROM 606 for storing predetermined threshold values used for the area judgment, a signal combining circuit 607, an edge signal generator 608, and a comparator 609. The signal combining circuit 607 converts the inputted color signals R, G and B into luminance signals, combines the converted luminance signals and outputs the combined luminance signal d to the edge signal generator 608.

The edge signal generator 608 calculates the difference between the maximum value and the minimum value of respective densities of the pixels located within the 3×3 pixel window W3 having a specified pixel P0 positioned in the center thereof in response to the combined luminance signal d, and outputs an edge signal e having the level of the calculated difference to the comparator 609. The comparator 609 compares the edge signal e with the predetermined threshold value which is read out from the ROM 606. If the edge signal e is equal to or larger than the threshold value, it is judged that the pixel of the color signals R, G and B corresponding to the edge signal e is positioned in a binary image area including characters, and then, the comparator 609 outputs a high level area judgment signal to the selector 604. Otherwise, it is judged that the pixel of the color signals R, G and B corresponding to the edge signal e is positioned in a half-tone image area, and then, the comparator 609 outputs a low level area judgment signal to the selector 604.

The hue judgment circuit 605 judges whether or not the hue of the specified pixel P0 corresponds to either one of seven hues: yellow, magenta, cyan, black, red, green and blue, and outputs hue signals r1, g1 and b1 of three bits corresponding to the judged hue to the binarizing circuit 603 and the ROM 606. The hue signals r1, g1 and b1 are inputted to the address terminals of the ROM 606, and the ROM 606 outputs a digital signal of eight bits of the threshold value for the area judgment performed in response to the hue of the pixel, to the comparator 609. The comparator 609 judges whether the pixel is positioned in either a half-tone image area or a binary image area by comparing the edge signal e with the predetermined threshold value which is read out from the ROM 606, and outputs the judgment signal to the selector 604, as described above.

In order to select one set of color signals for which a process suitable for the kind of the image area where the pixel is positioned has been performed, one set of color signals is selected by the selector 604 among a set of color signals filtered by the filtering circuit 601 and a set of color signals outputted from the binarizing circuit 603 according to the area judgment signal outputted from the comparator 609, and the selected one set of color signals is outputted as color signals r, g and b to the color correction and UCR circuit 611. The color correction and UCR circuit 611 performs not only a color correction process for substantially rejecting the turbidity of the image of the pixel but also a UCR process, generates color signals C, M, Y and K of cyan, magenta, yellow and black, and outputs them to a color printer (not shown). The color printer reproduces a document image on a recording medium such as a piece of copying paper with toners of colors corresponding to the color signals C, M, Y and K in response to the color signals C, M, Y and K.

In the above-mentioned area judgment circuit shown in FIG. 3, when the area judgment circuit performs the area judgment process for a pixel positioned in a binary area having a slightly small edge component, it may be judged in error that a half-tone area having a slightly large edge component is a binary area. At that time, a half-tone image can not be reproduced with a gradation characteristic which changes smoothly. In order to prevent the above-mentioned erroneous area judgment, when the threshold values stored in the ROM 606 are changed, the area judgment circuit judges that only a binary image area having a sufficiently large edge component is a binary image area, resulting in deterioration of the reproductivity of the binary image area.

Further, taking a general characteristic of the color printer into consideration, when a character portion, particularly a black character portion which is important when reproducing a document image including a combination of characters and a half-tone photograph, is reproduced with black toner so as to form black characters, there can be obtained a better reproduction characteristic because of the following reasons. The color printer reproduces a full color image by forming toner images of cyan, yellow, magenta and black on a recording medium such as a piece of copying paper with superimposing them. However, when a black image is reproduced with toners of cyan, yellow and magenta by completely superimposing them, it is difficult to obtain a satisfied degree of achromatic color and a satisfied density. Further, if a position of a toner image of a color is shifted from a position of a toner image of another color upon superimposing plural toner images of above-mentioned colors, edges of each black character are colored with a color.

An object of the present invention is to provide a digital color copying machine capable of improving a quality of an image of black characters by reproducing black characters with only black toner, and capable of reproducing a document image of good quality by decreasing the above-mentioned erroneous area judgments wherein it is judged that an image other than other than black characters is located in a binary image area.

A further object of the present invention is to provide a digital color copying machine capable of preventing edges of each black character from being colored with a color.

In order to accomplish the above objects, according to one aspect of the present invention, there is provided a digital color copying machine comprising: a monochromatic signal generator, said generator generating a monochromatic signal in response to inputted plural color signals obtained by reading a color document image; an edge emphasizer, said edge emphasizer emphasizing edge components of said color signals with a predetermined edge emphasis amount, and outputting an edge emphasis image signal; a digitizer, said digitizer digitizing said monochromatic signal and outputting a binary signal of said monochromatic signal; a first area detector, said first area detector detecting a first image area comprising an inner area of black characters other than edges of said black characters, said black characters being included in a color document image and said black characters being printed in black in response to said inputted plural color signals; a second area detector, said second area detector detecting a second image area where there are edges of said black characters of said color document image in response to said inputted plural color signals; a third area detector, said third area detector detecting a third image area where there are color characters other than said black characters in response to said inputted plural color signals; a first reproducer, said first reproducer reproducing, in response to said binary signal, said document image included in said first image area detected by said first area detector on a recording medium with only black toner; a second reproducer, said second reproducer reproducing, in response to said binary signal, said color document image included in said second image area detected by said second area detector on said recording medium with only black toner; and a third reproducer, said third reproducer reproducing, in response to said binary signal, said color document image included in said third image area detected by said third area detector on aid recording medium with cyan toner, yellow toner, magenta toner and black toner, after emphasizing edge components of said color signals with an edge emphasis amount larger than that of the other areas of said document image by said edge emphasizer.

According to another aspect of the present invention, there is provided a digital color copying machine comprising: a monochromatic signal generator, said generator generating a monochromatic signal in response to inputted plural color signals obtained by reading a color document image; an edge emphasizer, said edge emphasizer emphasizing edge components of said color signals with a predetermined edge emphasis amount, and outputting an edge emphasis image signal; a pseudo digitizer, said pseudo digitizer generating a pseudo binary signal by steepening the contrast of said monochromatic signal; a first area detector, said first area detector detecting a first image area comprising an inner area of black characters other than edges of said black characters, said black characters being included in a color document image and said black characters being printed in black in response to said inputted plural color signals; a second area detector, said second area detector detecting a second image are where there are edges of said black characters of said color document image in response to said inputted plural color signals; a third area detector, said third area detector detecting a third image area where there are color characters other than said black characters in response to said inputted plural color signals; a first reproducer, said first reproducer reproducing, in response to said pseudo binary signal, said color document image included in said first image area detected by said first area detector on a recording medium with only black toner in response to said pseudo binary signal; a second reproducer, said second reproducer reproducing, is response to said pseudo binary signal, said color document image included in said second image area detected by said second area detector on said recording medium with only black toner; and a third reproducer, said third reproducer reproducing, in response to said emphasis image signal, said color document image included in said third image area detected by said third area detector on said recording medium with cyan toner, yellow toner, magenta toner and black toner, after emphasizing edge components of said color signals with an edge emphasis amount larger than that of the other areas of said document image by said edge emphasizer.

According to a further aspect of the present invention, there is provided a digital color copying machine comprising: a monochromatic signal generator, said generator generating a monochromatic signal in response to inputted plural color signals obtained by reading a color document image; an edge emphasizer, said edge emphasizer emphasizing edge components of said color signals with a predetermined edge emphasis amount, and outputting an edge emphasis image signal; a zoomer, said zoomer performing a zooming process for said edge emphasis image signal with a predetermined zooming ratio and outputting a zoomed image signal; a pseudo digitizer, said pseudo digitizer generating a pseudo binary signal by steepening the contrast of said monochromatic signal with a contrast conversion characteristic determined according to said zooming ratio; a first area detector, said first area detector detecting a first image area comprising an inner area of black characters other than edges of said black characters, said black characters being included in a color document image and said black characters being printed in black in response to said inputted plural color signals; a second area detector, said second area detector detecting a second image area where there are edges of said black characters of said color document image in response to said inputted plural color signals; a third area detector, said third are detector detecting a third image area where there are color characters other than said black characters in response to said inputted plural color signals; a first reproducer, said first reproducer reproducing, in response to said pseudo binary signal, said color document image included in said first image area detected by said first area detector on a recording medium with only black toner; a second reproducer, said second reproducer reproducing, in response to said pseudo binary signal, said color document image included in said second image area detected by said second area detector on said recording medium with only black toner; a third reproducer, said third reproducer reproducing, in response to said zoomed image signal, said color document image included in said third image area detected by said third area detector on said recording medium with cyan toner, yellow toner, magenta toner and black toner, after emphasizing edge components of said color signals with an edge emphasis amount larger than that of the other areas of said document image by said edge emphasizer, and performing said zooming process for said edge emphasis signal by said zoomer.

In the digital color copying machines noted above, the monochromatic signal generator combines said inputted plural color signals and outputs said monochromatic signal corresponding to one of a luminance and a density of said inputted plural color signals.

In the above-noted digital color copying machines, said area detectors may comprise: a monochromatic signal generator for generating a monochromatic signal in response to said inputted plural color signals.

BRIEF DESCRIPTION OF THE DRAWINGS

These and other objects and features of the present invention will become clear from the following description taken in conjunction with the preferred embodiment thereof with reference to the accompanying drawings, in which:

FIGS. 4a and 4b are schematic block diagrams showing a signal processing section of a digital color copying machine of a preferred embodiment according to the present invention;

FIG. 5 is a schematic block diagram showing a density converting circuit shown in FIG. 4a;

FIG. 7 is a schematic block diagram showing a line memory shown in FIG. 4a;

FIG. 8 is a schematic block diagram showing an edge emphasis circuit shown in FIG. 4a;

FIG. 9 is a schematic block diagram showing a method for detecting an edge amount of an image signal which is used in an edge amount detection circuit shown in FIG. 8;

FIG. 16 is a diagram showing relationship between input signals and an output signal of a priority encoder shown in FIG. 15;

FIG. 17 is a schematic block diagram showing a monochromatic signal edge emphasis circuit shown in FIG. 4a;

FIG. 18 is a schematic block diagram showing an area judgment circuit shown in FIG. 4a;

FIG. 32 is a schematic block diagram showing a judgment process circuit shown in FIG. 4b;

DETAILED DESCRIPTION OF THE PREFERRED EMBODIMENT

Figure 1:
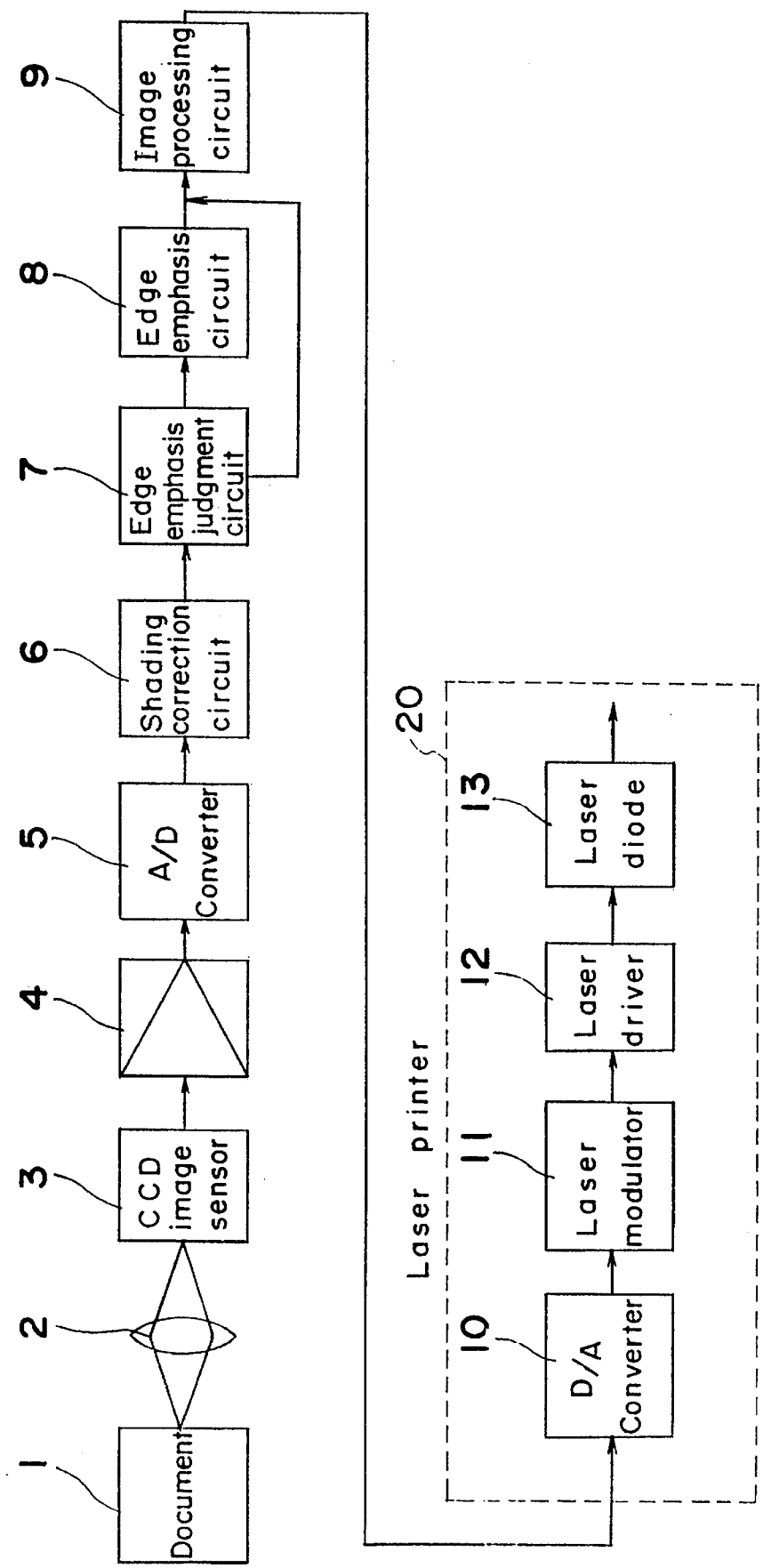
FIG. 1 is a schematic block diagram showing a signal processing section of a conventional digital copying machine.
Figure 2:
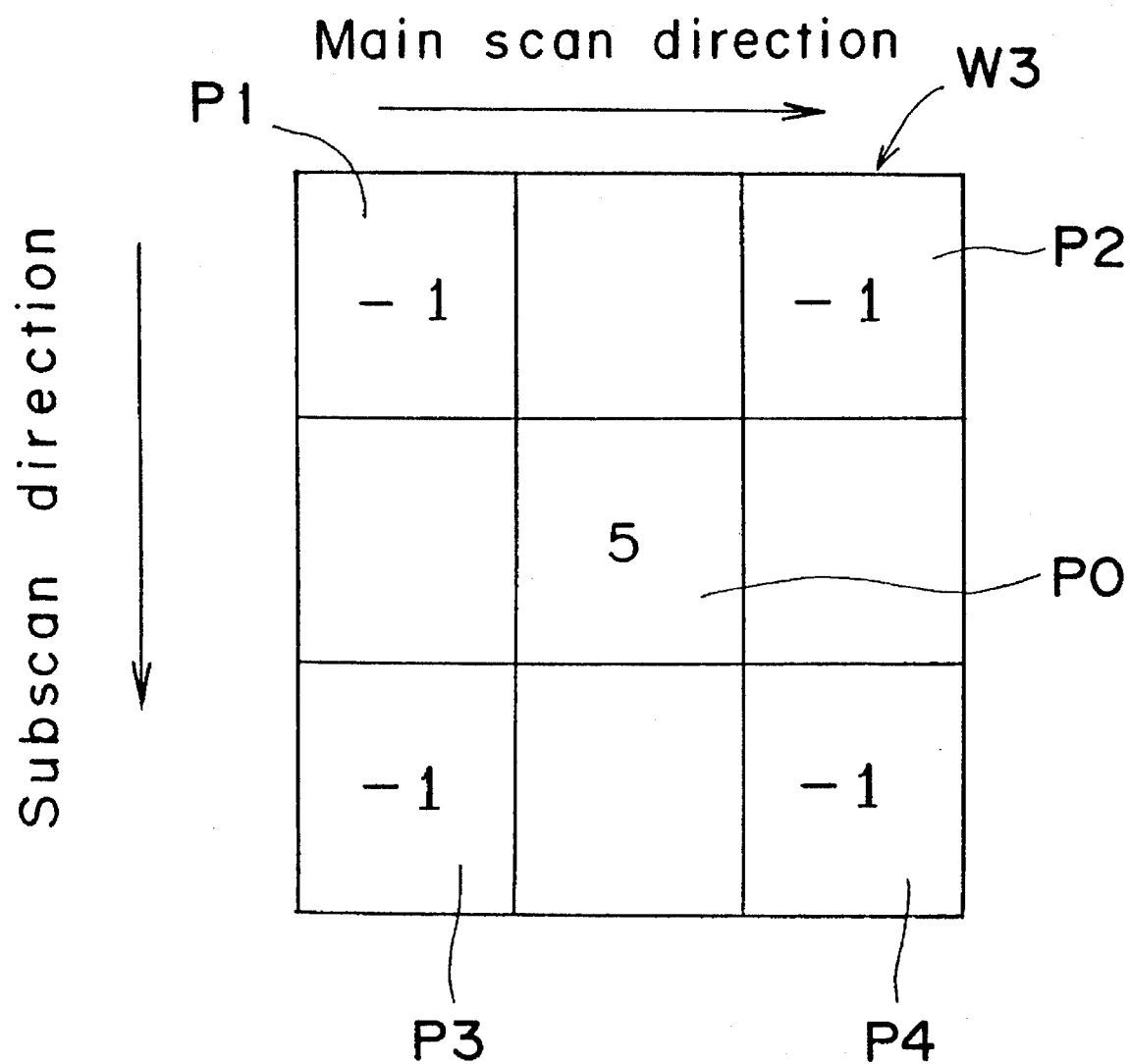
FIG. 2 is a schematic diagram showing a method for performing an edge emphasis process which is used in a conventional edge emphasis circuit shown in FIG. 1.
Figure 3:
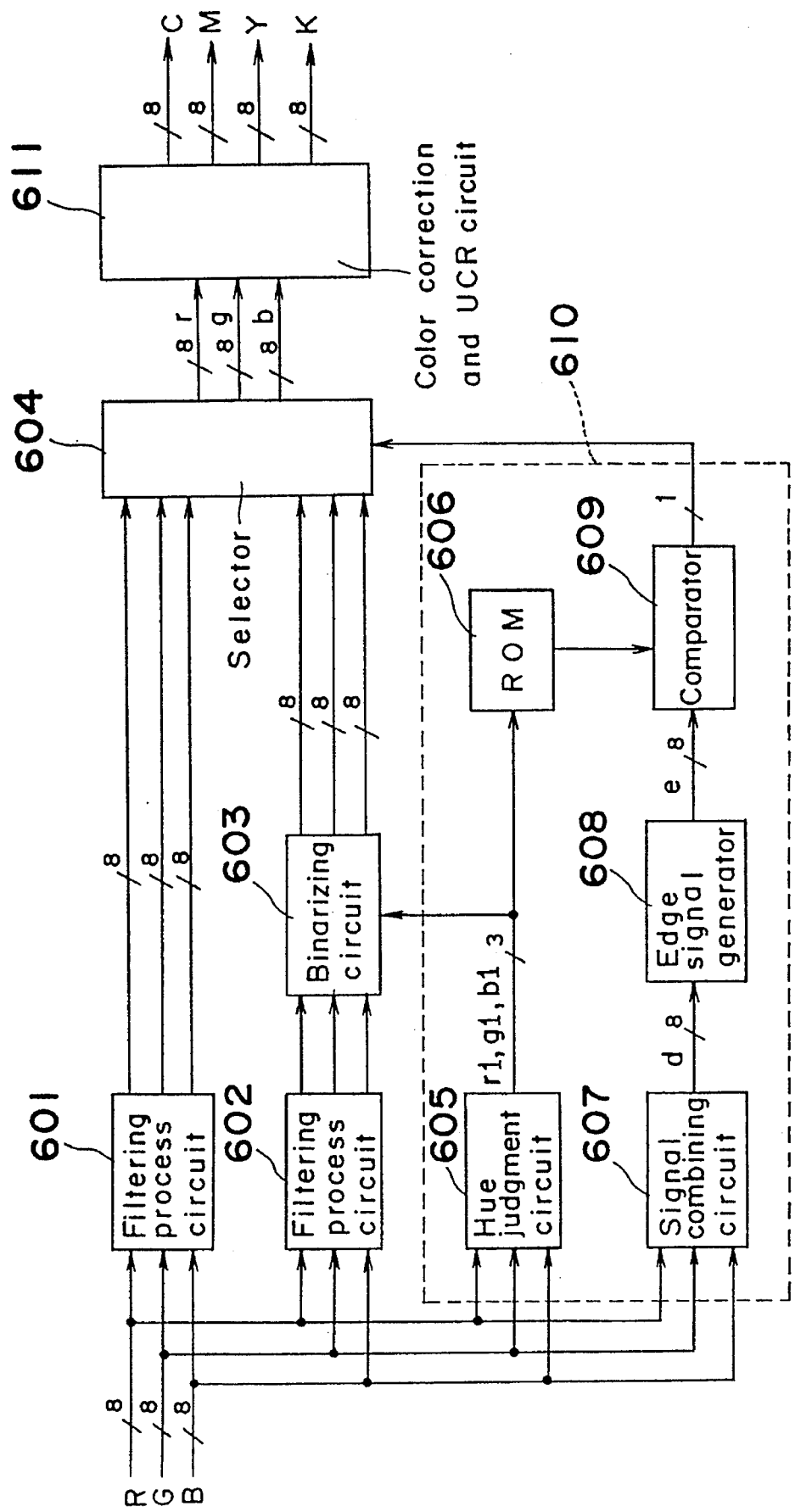
FIG. 3 is a schematic block diagram showing a conventional area judgment circuit which is used in a conventional digital copying machine.

A preferred embodiment according to the present invention will be described below with reference to the attached drawings.

FIGS. 4a and 4b are schematic block diagrams showing a signal processing section of a digital color copying machine of a preferred embodiment according to the present invention.

Referring to FIG. 4a, a document is scanned and is illuminated by an illumination lamp (not shown), and light including a document image reflected from the document is incident onto a line type CCD image sensor 21. The CCD image sensor 21 converts the document image including image information into image signals R, G and B of red, green and blue including density information of the document image, and outputs the image signals R, G and B to an amplifier 22. The amplifier 22 amplifies the image signals R, G and B, and outputs the amplified image signals R', G' and B' to an A/D converter 23. The A/D converter 23 converts the amplified analogue image signals R', G' and B' into digital image signals Rd, Gd and Bd, and outputs them to a shading correction circuit 24. The shading correction circuit 24 performs a shading correction process for substantially reject a shading distortion for the digital image signals Rd, Gd and Bd, and outputs the shading-corrected image signals R", G" and B" to a density converting circuit 25. The density converting circuit 25 converts the digital image signals R", G" and B" represented with a reflectance scale into digital image signals C, M and Y of cyan, magenta and yellow represented with a density scale, and outputs the converted digital image signals C, M and Y to a line memory 26.

The line memory 26 is provided for delaying the image signals C, M and Y by delay times of predetermined numbers of scan lines in the main scan direction in order to perform a windowing process using a 5×5 pixel window W5 (referred to as a 5×5 windowing process hereinafter) in an edge emphasis circuit 27, a monochromatic signal edge emphasis circuit 57 and an area judgment circuit 28. The line memory 26 delays the image signals C, M and Y by no delay time, by a delay time of one scan line in the main scan direction, by a delay time of two scan lines in the main scan direction, by a delay time of three scan lines in the main scan direction, and by a delay time of four scan lines in the main scan direction, respectively, and outputs the delayed image signals 41 to 43 of cyan, magenta and yellow to the edge emphasis circuit 27, the monochromatic signal edge emphasis circuit 57 and the area judgment circuit 28.

The edge emphasis circuit 27 performs a predetermined edge emphasis process for the image signal of the specified pixel P0 among the inputted image signals 41 to 43, and outputs the processed edge emphasis image signals Ec, Em and Ey to a masking circuit 29.

The monochromatic signal edge emphasis circuit 57 generates a monochromatic signal by combining the image signals 41 to 43, performs an edge emphasis process for the generated monochromatic signal, and outputs the processed signal Et to a judgment process circuit 58.

The area judgment circuit 28 generates a high level area detection signal Ba for representing an area in which the reproduced image thereof is to have a predetermined maximum gray density, a high level area detection signal Na for representing an area in which the reproduced image thereof is to be an image of achromatic color, and a high level area detection signal E for representing an area in which the edge emphasis amount of the edge emphasis process is to be set so as to be larger than that of the other area. The area judgment circuit 28 outputs the generated area detection signals Ba and Na to the judgment process circuit 58, and also outputs the generated area detection signal E to the edge emphasis circuit 27 and the monochromatic signal edge emphasis circuit 57.

The judgment process circuit 58 performs a predetermined judgment process which is described in detail later, for the monochromatic signal for which the edge emphasis process has been performed according to the detection area detection signal Ba and Na, outputs the processed signal Etp and a selection signal t to a selector 30.

The masking circuit 29 performs a predetermined masking process including a color correction process and a black signal generation process in response to the edge emphasis image signals Ec, Em and Ey, and outputs the processed image signals Cm, Mm, Ym and Km of cyan, magenta, yellow and black to the selector 30.

The selector 30 selects one of the image signals Cm, Mm, Ym and Km outputted from the masking circuit 29 and the signal Etp outputted from the judgment process circuit 58, and outputs the selected signal S to a zooming circuit 50.

The zooming circuit 50 performs a zooming process in a direction parallel to the scan lines or in the main scan direction for the selected signal S by performing an interpolation process and a thinning process for the inputted image signals, and outputs the processed signal Z to a γ correction circuit 31 of a laser printer 20a. It is to be noted that a zooming process in the subscan direction is performed by changing a speed of the subscan of an image reader unit. For example, when the speed of the subscan is set so as to be half the original speed thereof, there can be obtained a zooming ratio of 200%.

The laser printer 20a comprises the γ correction circuit 31, a D/A converter 32, a pulse width modulator (PWM) 33, a laser driver 34, and a laser diode 35, which are well known to those skilled in the art.

The γ correction circuit 31 performs a γ correction process for correcting the gradation characteristic of the laser printer 20a, and outputs the γ-corrected signal Sg to the D/A converter 32. The D/A converter 32 converts the digital signal Sg into an analogue signal, and outputs the converted analogue signal to the pulse width modulator 33. The pulse width modulator 33 modulates a pulse width of a pulse signal according to the analogue signal outputted from the D/A converter 32, and outputs the PWM signal to the laser driver 34. The laser driver 34 drives the laser diode 35 according to the PWM signal.

The digital color copying machine further comprises a controller 40 for controlling the operation thereof and providing predetermined threshold values to circuits which are described in detail later.

In the digital color copying machine constituted as described above, toner images of cyan, yellow, magenta and black of a color document image which has been read by the CCD image sensor 21 are sequentially superimposed by the laser printer 20a so that the color document image is formed on a piece of copying paper. At that time, the CCD image sensor 21 scans the document image four times, and the selector 30 selects one of the image signals corresponding to a color of the document image to be reproduced by the laser printer 20a. It is to be noted that, when the selection signal t becomes the high level upon selecting one of the image signals Cm, Mm and Ym, the selector 30 outputs the selected image signal S having the low level. Further, when the selection signal t becomes the high level upon selecting the image signal Km, the selector 30 outputs the image signal Etp.

Thus, a black character area in a document image is judged, and the document image is reproduced with only black toner on a recording medium such as a piece of copying paper. Since black characters are reproduced with only black toner, the black characters can be reproduced with a satisfied degree of achromatic color and a satisfied density, and also there can be prevented coloring of edges of the black characters which may be caused by the above-mentioned position shift upon superimposing respective color toner images.

The density converting circuit 25 shown in FIG. 4a will be described below with reference to FIG. 5 which is a schematic block diagram thereof.

Figure 5:
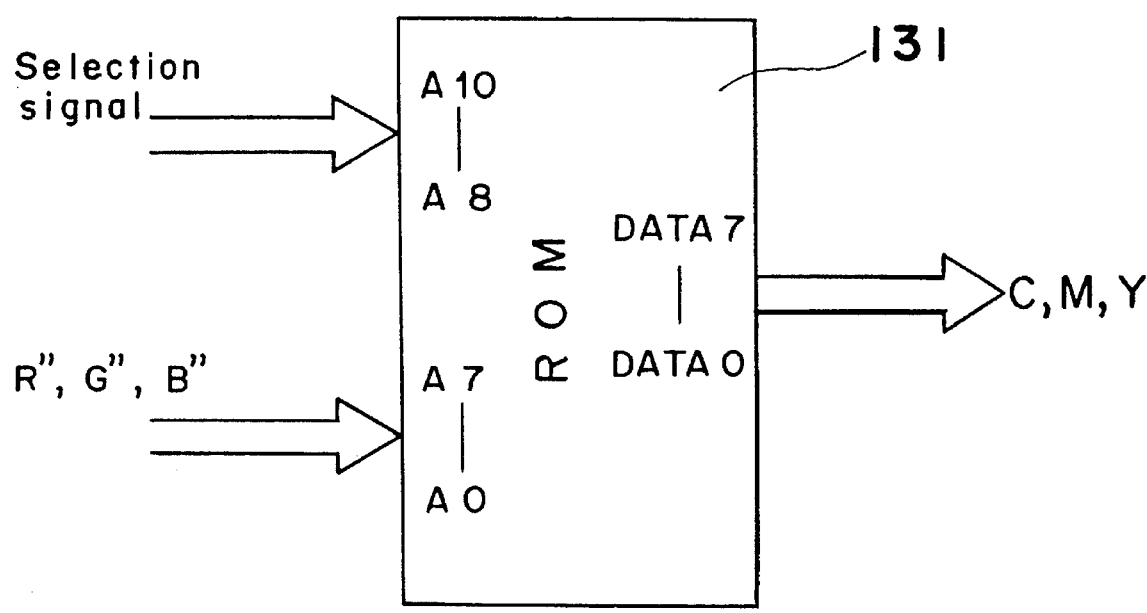

Referring to FIG. 5, the density converting circuit 25 is composed of three ROMs 131 corresponding to respective image signals R", G" and B". In each of the ROMs 131, there is stored eight kinds of look-up tables. It is to be noted that only one ROM 131 is shown in FIG. 5. The image signal R", G" or B" of eight bits represented by the reflectance scale is inputted to the address terminals A0 to A7 of the ROM 131, and a selection signal of three bits for selecting one of the eight kinds of look-up tables which is outputted from the controller 40 for controlling the digital copying machine is inputted to the address terminals A8 to A10 of the ROM 131. The ROM 131 outputs a digital signal C, M or Y represented by the density scale which is shown in FIG. 4a.

Figure 6:
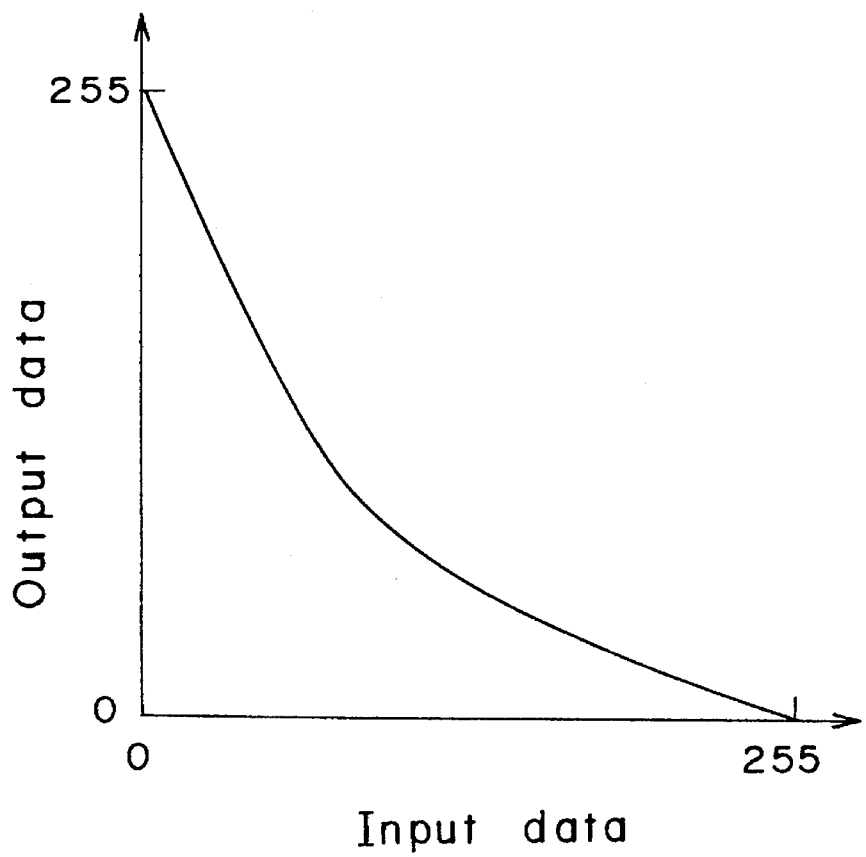
FIG. 6 is a graph showing data to be stored in a look-up table of the density converting circuit shown in FIG. 5.

FIG. 6 is a graph showing data of a look-up table to be stored in the ROM 131 of the density converting circuit 25 shown in FIG. 5. It is to be noted that a reflectance is converted into a density value by calculating the logarithm of the reflectance. A contrast of an image to be reproduced and a dynamic range of the density can be changed by changing the shape of the curve of the look-up table shown in FIG. 6. In the present preferred embodiment, the above-mentioned eight kinds of eight kinds of look-up tables are stored in the ROM 131, and one of look-up tables can be selected according to the selection signal.

FIG. 7 is a schematic block diagram showing the line memory 26 shown in FIG. 4a.

Referring to FIG. 7, the line memory 26 comprises three line memory 26a to 26c for processing the image signal C, M and Y, respectively, which are constituted in a manner similar to each other.

The line memory 26a comprises four one line delay memories 141 to 144 which are connected in series, each one delay memory for delaying an inputted image signal C by a delay time of one scan line in the main scan direction. Accordingly, the line memory 26a outputs the image signal C delayed by no delay time directly as it is, the image signal C delayed by a delay time of one scan line from the one line delay memory 141, the image signal C delayed by a delay time of two scan lines from the one line delay memory 142, the image signal C delayed by a delay time of three scan lines from the one line delay memory 143, and the image signal C delayed by a delay time of four scan lines from the one line delay memory 144, which are denoted by 41.

Similarly, the line memory 26b outputs the image signal M delayed by no delay time directly as it is, the image signal C delayed by a delay time of one scan line, the image signal M delayed by a delay time of two scan lines, the image signal M delayed by a delay time of three scan lines, and the image signal M delayed by a delay time of four scan lines, which are denoted by 42. Further, the line memory 26c outputs the image signal Y delayed by no delay time directly as it is, the image signal Y delayed by a delay time of one scan line, the image signal Y delayed by a delay time of two scan lines, the image signal Y delayed by a delay time of three scan lines, and the image signal Y delayed by a delay time of four scan lines, which are denoted by 43.

Figure 8:
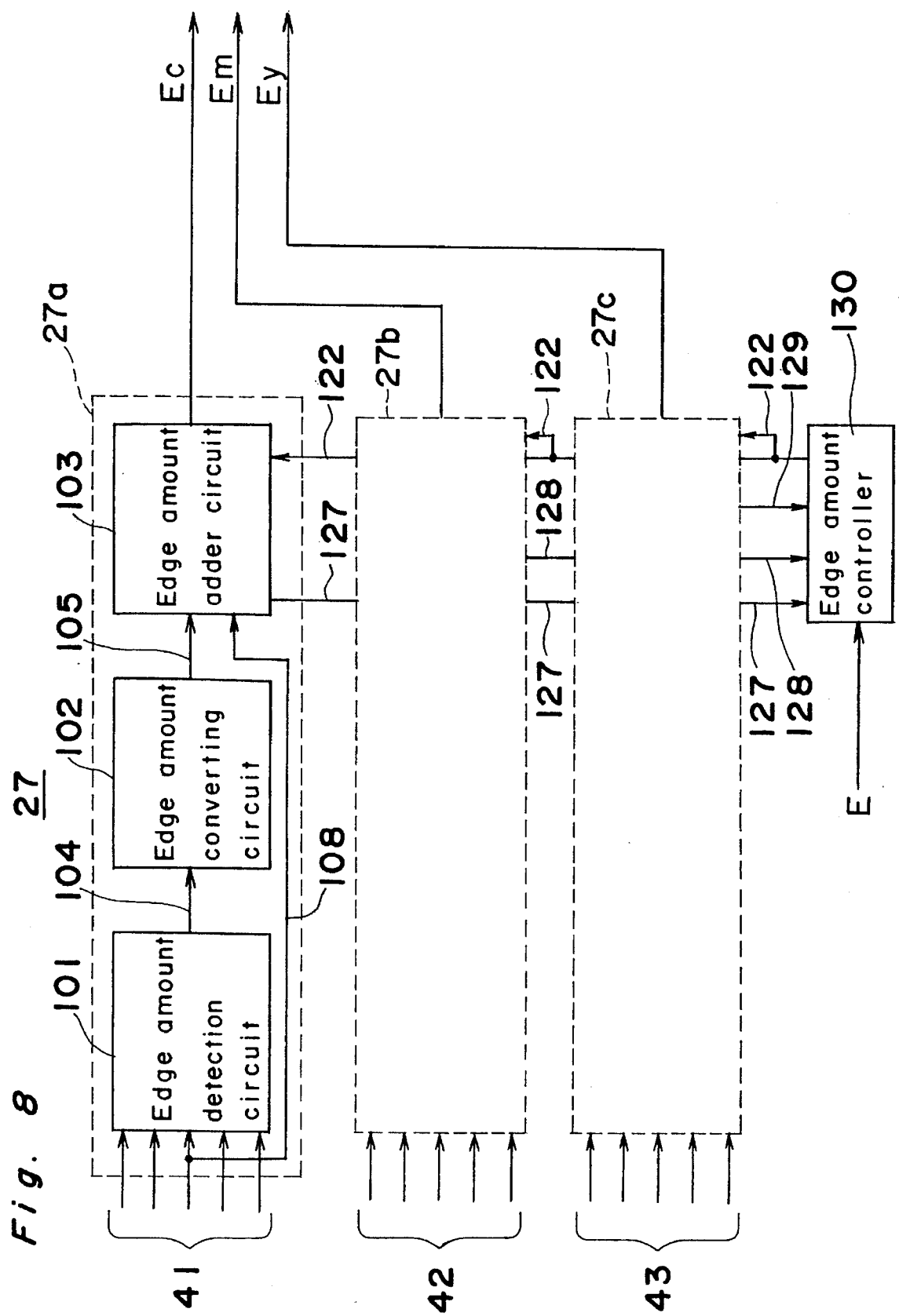

FIG. 8 is a schematic block diagram showing the edge emphasis circuit 27 shown in. FIG. 4a.

Referring to FIG. 8, the edge emphasis circuit 27 comprises three edge emphasis circuit 27a to 27c which are constituted in a manner similar to each other, and an edge amount controller 130. Each of the edge emphasis circuit 27a to 27c comprises an edge amount detection circuit 101, an edge amount converting circuit 102, and an edge amount adder circuit 103.

The circuits 101 to 103 of the edge emphasis circuit 27 will be described below.

In response to the five image signals 41 whose delay times are different from each other, the edge emphasis amount detection circuit 101 scans the inputted image signals 41 within the 5×5 pixel window W5 in the center of which the specified pixel P0 is positioned, and generates an edge amount signal 104 depending on an edge amount of the specified pixel P0 to the edge amount converting circuit 102. The edge amount converting circuit 102 converts the edge amount signal 104 into an edge amount signal 105 having a level which is changed according to the level of the edge amount, and outputs the converted edge amount signal 105 to the edge amount adder circuit 103. The edge amount adder circuit 103 adds the density signal 108 of the specified pixel P0 which has been delayed by a delay time of two scan lines, and respective products of the converted edge amount signal 105 and respective plural different predetermined coefficients, judges whether or not respective added values are depart from the predetermined dynamic range of the image signal, and outputs a saturation state signal 127 for representing the judgment result, to the edge amount controller 130. Further, the edge amount adder circuit 103 selects one of the above-mentioned added values according to an edge emphasis amount selection signal 122 inputted from the edge amount controller 130, and outputs an edge emphasis signal Ec of the selected addition value for which the predetermined edge emphasis process has been performed.

Similarly, in response to the image signals 42, the edge emphasis circuit 27b outputs a saturation state signal 128 to the edge amount controller 130, and outputs an edge emphasis signal Em for which the predetermined edge emphasis process has been performed, according to the edge emphasis amount selection signal 122 which is inputted from the edge amount controller 130. Further, in response to the image signals 43, the edge emphasis circuit 27c outputs a saturation state signal 129 to the edge amount controller 130, and outputs an edge emphasis signal Ey for which the predetermined edge emphasis process has been performed, according to the edge emphasis amount selection signal 122 which is inputted from the edge amount controller 130.

It is to be noted that the edge amount controller 130 generates the edge emphasis amount selection signal 122 in response to the saturation state signals 127 to 129 respectively outputted from the edge emphasis circuits 27a to 27c and the detection signal E outputted from the area judgment circuit 28, and outputs the generated edge emphasis amount selection signal 122 to respective edge emphasis circuits 27a to 27c.

The action of the edge amount detection circuit 101 of the edge emphasis circuit 27a shown in FIG. 8 will be described below with reference to FIG. 9 which is a schematic diagram showing a method for detecting an edge amount of an image signal.

Referring to FIG. FIG. 9, in response to the image signals 41 which have been delayed by different delay times, the edge amount detection circuit 101 scans the image signals 41 within the 5×5 pixel window W5 in the center of which the specified pixel P0 is positioned, and then, the edge amount Ae of the specified pixel P0 is calculated using the following equation (1):

$$Ae=\text{(the density of the specified pixel P0)}\times 2 - \text{(the sum of the densities of the peripheral pixels P1 to P4 positioned at the four corners in the pixel window W5)}\times 0.5 \quad (1).$$

Then, the edge amount detection circuit 101 outputs the edge amount signal 104 having a level of the calculated edge amount Ae to the edge amount converting circuit 102.

The edge amount converting circuit 102 shown in FIG. 8 will be described below with reference to FIGS. 10 to 12.

Figure 10:
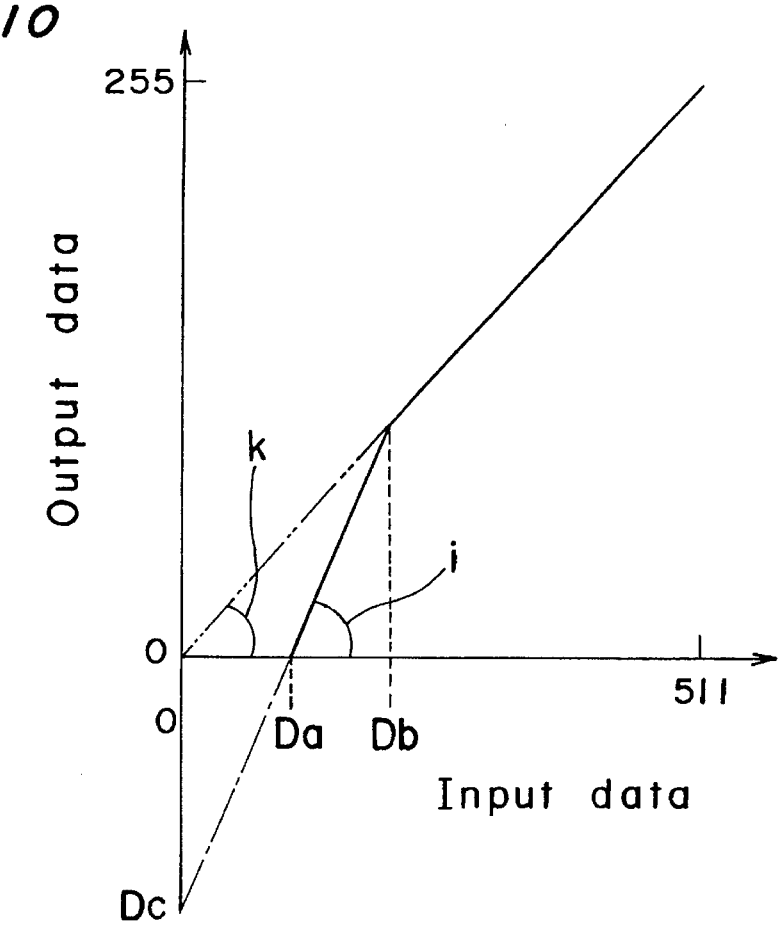
FIG. 10 is a graph showing a first conversion characteristic which is used in an edge amount converting circuit shown in FIG. 8.

FIG. 10 is a graph showing a first edge amount conversion characteristic which is used in the edge amount converting circuit 102 shown in FIG. 8.

As shown in FIG. 10, when the level of the edge amount signal 104 is smaller than a predetermined threshold level Da, the edge amount converting circuit 102 outputs the edge amount signal 105 having a level of zero. Further, when the level of the edge amount signal 104 is equal to or larger than a predetermined threshold level Db, the edge amount converting circuit 102 outputs the edge amount signal 105 having a level of the product of the edge amount signal 104 and a predetermined coefficient k. Furthermore, when the level of the edge amount signal 104 is equal to or larger than the predetermined threshold value Da and smaller than the predetermined threshold level Db, the edge amount converting circuit 102 outputs the edge amount signal 105 having a level of the sum of a predetermined constant value Dc, and the product of the edge amount signal 104 and a predetermined coefficient i. It is to be noted that the coefficient i and the constant value Dc are set so that the edge amount conversion characteristic becomes continuous at inflection points thereof which are a point thereof when the level of the edge amount signal 104 is the threshold value Da and a point thereof when the level of the edge amount signal 104 is the threshold value Db.

Figure 11:
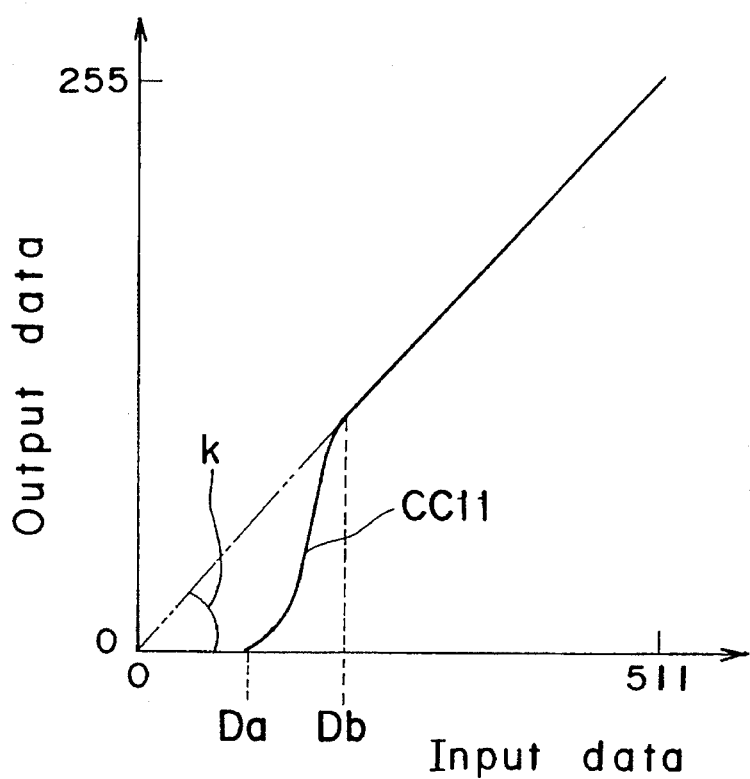
FIG. 11 is a graph showing a second conversion characteristic which is used in the edge amount converting circuit shown in FIG. 8.

FIG. 11 is a graph showing a second edge amount conversion characteristic which is used in the edge amount converting circuit 102 shown in FIG. 8.

As shown in FIG. 11, when the level of the edge amount signal 104 is smaller than a predetermined threshold level Da, the edge amount converting circuit 102 outputs the edge amount signal 105 having a level of zero. Further, when the level of the edge amount signal 104 is equal to or larger than a predetermined threshold level Db, the edge amount converting circuit 102 outputs the edge amount signal 105 having a level of the product of the edge amount signal 104 and a predetermined coefficient k. Furthermore, when the level of the edge amount signal 104 is equal to or larger than the predetermined threshold value Da and smaller than the predetermined threshold level Db, the edge amount converting circuit 102 outputs the edge amount signal 105 having a level which changes non-linearly according to the characteristic curve CC11 shown in FIG. 11, wherein the gradient of the characteristic curve CC11 is relatively small in the beginning thereof and the gradient thereof is relatively larger in the end thereof. It is to be noted that the coefficient i are set so that the edge amount conversion characteristic becomes continuous at inflection points thereof which are a point thereof when the level of the edge amount signal 104 is the threshold value Da and a point thereof when the level of the edge amount signal 104 is the threshold value Db.

Figure 12:
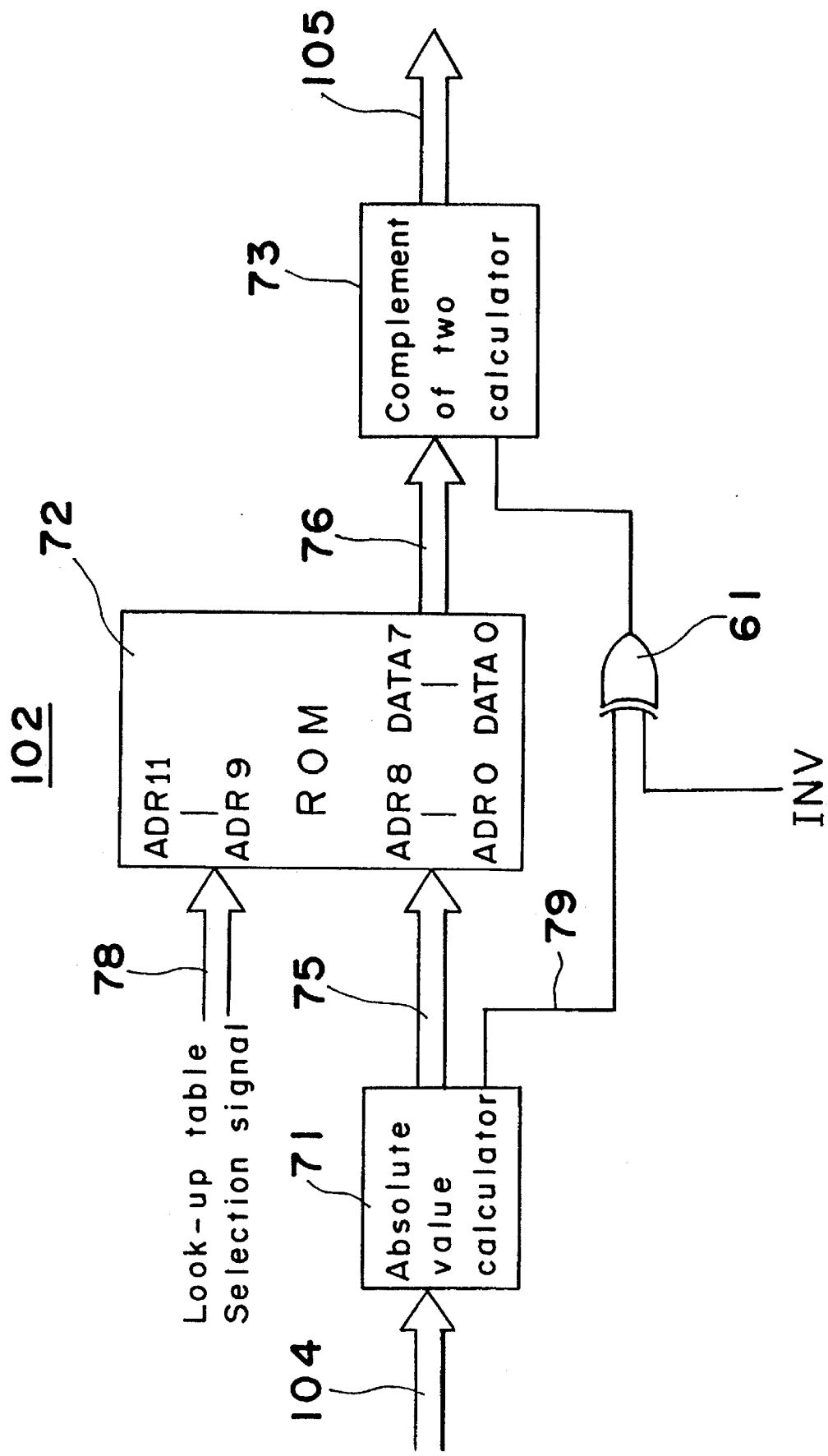
FIG. 12 is a schematic block diagram showing the edge amount converting circuit shown in FIG. 8.

FIG. 12 is a schematic block diagram showing the edge amount converting circuit 102 shown in FIG. 8 which has the first and second edge amount converting characteristics shown in FIGS. 10 and 11.

Referring to FIG. 12, the edge amount converting circuit 102 comprises an absolute value calculator 71, a ROM 72 for storing eight kinds of look-up tables of the above-mentioned edge amount converting characteristics, an exclusive OR gate 61, and a complement of two calculator 73.

The absolute value calculator 71 outputs data 75 of the absolute value (referred to as absolute value data hereinafter) of the inputted edge amount signal 104 to the address terminals ADR0 to ADR8 of the ROM 72, and also outputs data 79 of the sign bit (referred to as sign bit data hereinafter) of the edge amount signal 104 to the first input terminal of the exclusive OR gate 61. A look-up table selection signal 78 of three bits which is outputted from the controller 40 for controlling the digital copying machine is inputted to the address terminals ADR9 to ADR11 of the ROM 72, and one of the above-mentioned eight kinds of look-up tables stored therein is selected according to the selection signal 78. Then, positive data 76 of eight bits which have been specified by the absolute value data 75 in the selected look-up table are read from the ROM 72, and are outputted from the data terminals DATA0 to DATA7 thereof to the complement of two calculator 73.

A control signal INV which is outputted from the controller 40 for controlling the digital copying machine is inputted to the second input terminal of the exclusive OR gate 61. The output signal of the exclusive OR gate 61 is inputted to the complement of two calculator 73. When the control signal INV is the high level, the sign bit data 79 is inverted and is outputted thereto. At that time, since the sign of the edge component of the image signal is reversed, there can be realized a process for shading off an image reproduced by the image signal. In response to the positive data 76 of eight bits and the sign data outputted from the exclusive OR gate 61, the complement of two calculator 73 calculates the complement of two thereof, and outputs the edge amount signal 105 having a level of the calculated complement of two.

When there is prepared and stored in the ROM 72 plural look-up tables having different plural threshold values Da shown in FIGS. 10 and 11, a suppression amount upon suppressing the noise included in the image signal to be processed by the edge emphasis process can be changed by altering the look-up table to be selected. Further, when there is prepared and stored in the ROM 72 plural look-up tables having different coefficients k shown in FIGS. 10 and 11, the edge emphasis amount can be changed by altering the look-up table to be selected. Furthermore, when there is prepared and stored in the ROM 72 plural look-up tables having different plural threshold values Db shown in FIGS. 10 and 11, the edge emphasis amount converting characteristic or the continuity of the edge emphasis amount can be changed by altering the look-up table to be selected.

In the above-mentioned preferred embodiment, there is provided the ROM 72. However, the present invention is not limited to this. In stead of the ROM 72, there may be provided a RAM for storing at least one set of look-up table for converting the edge amount of the image signal. In this case, when altering the edge amount conversion characteristic, data of a look-up table to be altered may be written into the RAM by the controller 40 for controlling the digital copying machine.

Further, when the conversion characteristic has a folded line as shown in FIG. 10, there is not used a look-up table stored in a memory, and there may be provided an edge amount conversion characteristic shown in FIG. 10 using a multiplier and an adder etc.

Prior to description of the edge amount adder circuit 103, such a phenomenon that a color fine line and a color edge are reproduced with an achromatic color by performing the edge emphasis process will be described below.

Figure 13:
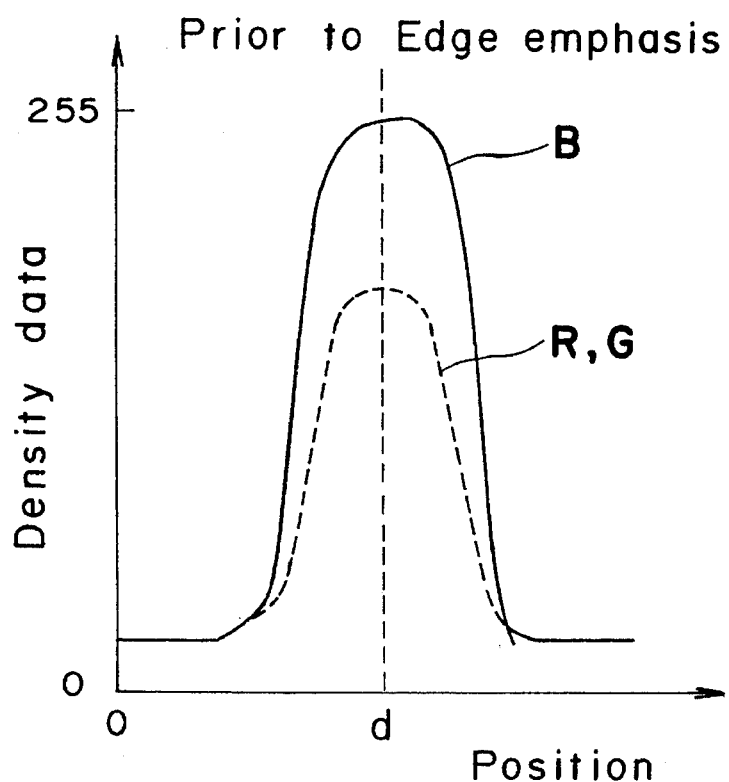
FIG. 13 is a graph showing density data of an image including a blue fine line prior to an edge emphasis process.

FIG. 13 is a graph showing color-dissolved density data R, G and B of eight bits which are obtained prior to the edge emphasis process when reading a blue fine line formed on a piece of white paper using an image reader.

As is apparent from FIG. 13, since the density data of B is larger than the density data of R and G at a position d, the color of the reproduced image thereat is blue.

Figure 14:
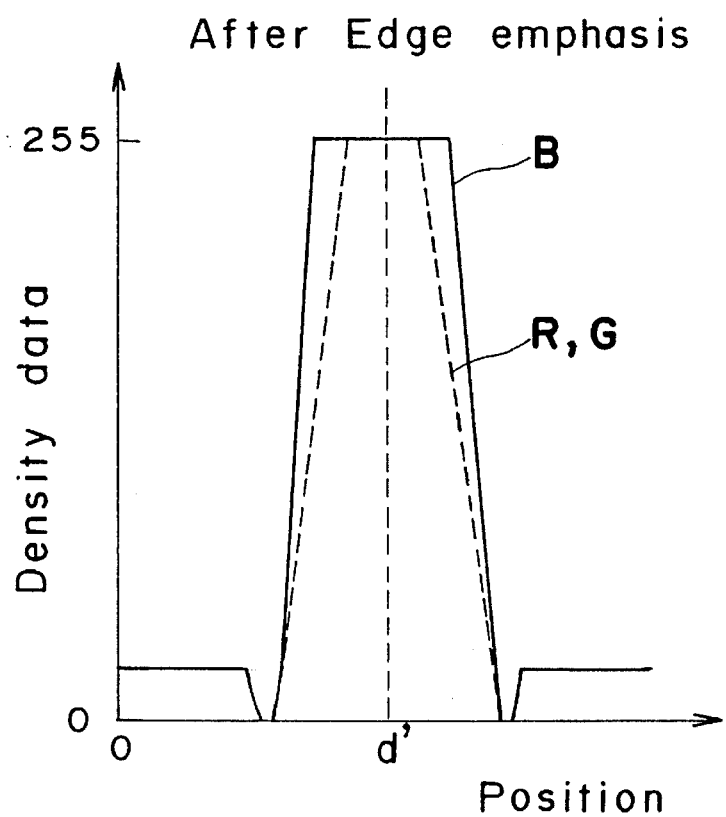
FIG. 14 is a graph showing density data after processing an edge emphasis process for density data of the image including the blue fine line shown in FIG. 13.

FIG. 14 is a graph showing density data after processing the edge emphasis process for the density data of the image including the blue fine line shown in FIG. 13.

As is apparent from FIG. 14, since all the density data of R, G and B are depart from the dynamic range of the density signal and are larger than the maximum value thereof due to the edge emphasis process, all the density data of R, G and B become 255, and then, a black image is reproduced. Thus, when the image signal obtained after performing the edge emphasis process is depart from the dynamic range of the density signal and are larger than the maximum value thereof due to the edge emphasis process, the image reproduced by the color signal becomes an achromatic color image.

Next, the edge amount adder circuit 103 and the edge amount controller 130 will be described below with reference to FIG. 15.

Figure 15:
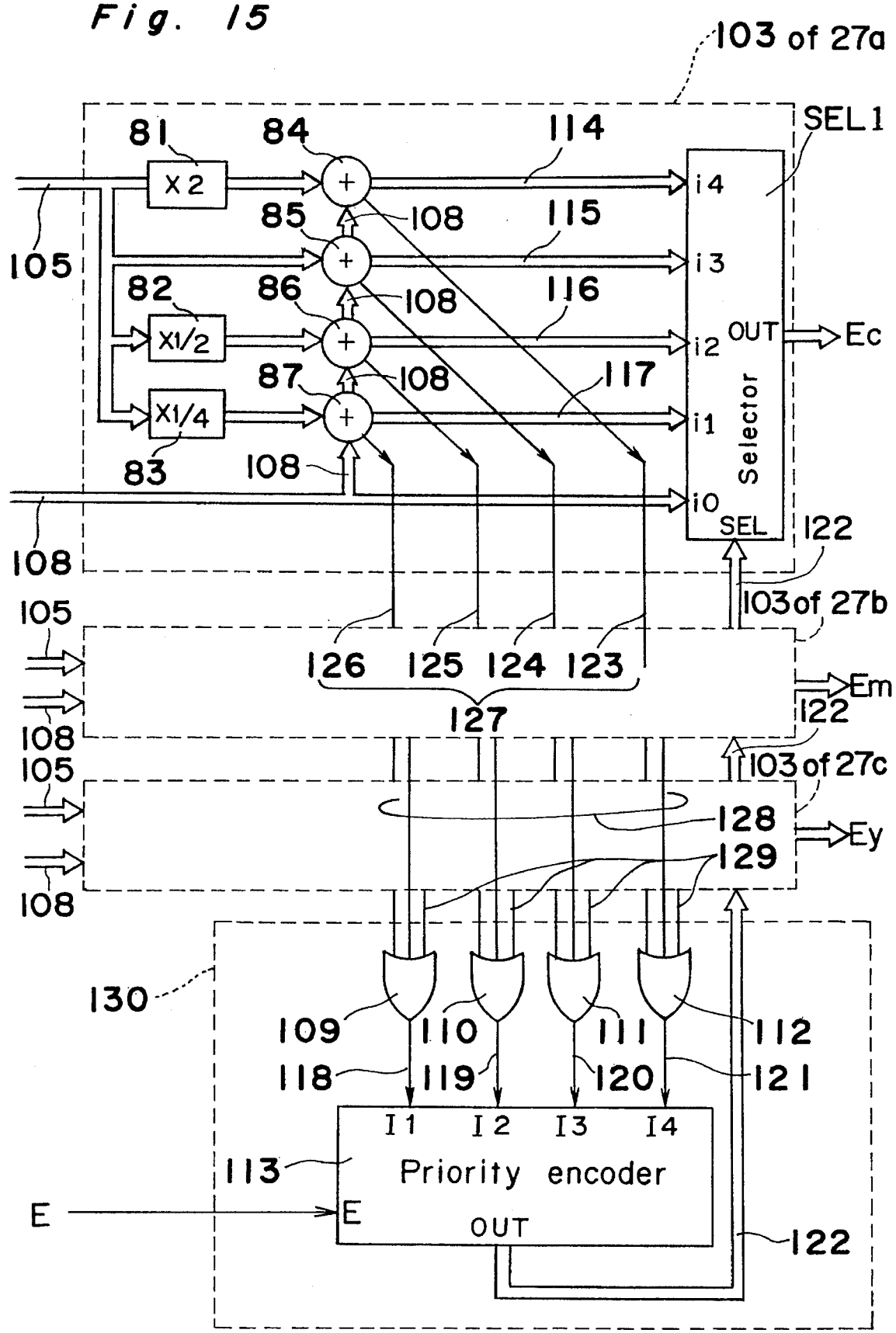
FIG. 15 is a schematic block diagram showing edge amount adder circuits and an edge amount controller shown in FIG. 8.

FIG. 15 is a schematic block diagram showing the edge amount adder circuits 103 of respective edge emphasis circuits 27a to 27c and the edge amount controller 130, which are shown in FIG. 8. It is to be noted that the edge amount adder circuits 103 of respective edge emphasis circuits 27a to 27c are constituted in a manner similar to each other.

Referring to FIG. 15, each of the edge amount adder circuit 103 comprises a multiplier 81 having a multiplier factor of two, a multiplier 82 having a multiplier factor of ½, a multiplier 83 having a multiplier factor of ¼, adders 84 to 87, and a selector SEL1. It is to be noted that each of the multipliers 81 to 83 can be constituted by a shift register circuit in a manner which is well known to those skilled in the art. Further, the edge amount controller 130 comprises four OR gates 109 to 112, and a priority encoder 113.

The multiplier 81 outputs a signal having a level of twice the level of the edge amount signal 105 to the first input terminal of the adder 84. The edge amount signal 105 is directly inputted to the first input terminal of the adder 85 as it is. The multiplier 82 outputs a signal having a level of half the level of the edge amount signal 105 to the first input terminal of the adder 86. The multiplier 83 outputs a signal having a level of a quarter of the level of the edge amount signal 105 to the first input terminal of the adder 87. The image signal 108 of the specified pixel P0 is directly inputted to respective second input terminals of the adders 84 to 87.

The adder 84 adds the signal outputted from the multiplier 81 to the image signal 108 of the specified pixel P0, and outputs an addition signal 114 of the addition result to the input terminal i4 of the selector SEL1. When the level of the addition signal 114 is depart from a dynamic range of the image signal which ranges from 0 to 255, the adder 84 outputs a high level saturation state signal 123 to the first input terminal of the OR gate 112 of the edge amount controller 130.

Similarly, the adder 85 adds the image signal 105 to the image signal 108 of the specified pixel P0, and outputs an addition signal 115 of the addition result to the input terminal i3 of the selector SEL1. When the level of the addition signal 115 is depart from the dynamic range of the image signal which ranges from 0 to 255, the adder 85 outputs a high level saturation state signal 124 to the first input terminal of the OR gate 111 of the edge amount controller 130.

Similarly, the adder 86 adds the signal outputted from the multiplier 82 to the image signal 108 of the specified pixel P0, and outputs an addition signal 116 of the addition result to the input terminal i2 of the selector SEL1. When the level of the addition signal 116 is depart from the dynamic range of the image signal which ranges from 0 to 255, the adder 86 outputs a high level saturation state signal 125 to the first input terminal of the OR gate 110 of the edge amount controller 130.

Similarly, the adder 87 adds the signal outputted from the multiplier 83 to the image signal 108 of the specified pixel P0, and outputs an addition signal 117 of the addition result to the input terminal i1 of the selector SEL1. When the level of the addition signal 117 is depart from the dynamic range of the image signal which ranges from 0 to 255, the adder 87 outputs a high level saturation state signal 126 to the first input terminal of the OR gate 109 of the edge amount controller 130.

In the present preferred embodiment, the saturation state signals 123 to 126 outputted from the edge amount adder circuit 103 of the edge emphasis circuit 27a shown in FIG. 8 are referred to as a set of saturation state signals 127. Similarly, the saturation state signals 123 to 126 outputted from the edge amount adder circuit 103 of the edge emphasis circuit 27b shown in FIG. 8, which are inputted to respective second input terminals of the OR gates 109 to 112 of the edge amount controller 130, are referred to as a set of saturation state signals 128. Further, the saturation state signals 123 to 126 outputted from the edge amount adder circuit 103 of the edge emphasis circuit 27c shown in FIG. 8, which are inputted to respective third input terminals of the OR gates 109 to 112 of the edge amount controller 130, are referred to as a set of saturation state signals 129.

The selector SEL1 selects one of the inputted image signals 114 to 117 according to the edge emphasis amount selection signal 122 outputted from the priority encoder 113 of the edge amount controller 130, and then, outputs the selected image signal for which a predetermined edge emphasis process has been performed.

In the present preferred embodiment, the selector SEL1 of the edge amount adder circuit 103 of the edge emphasis circuit 27a shown in FIG. 8 outputs the edge emphasis signal Ec of cyan selected according to the edge emphasis amount selection signal 122. The selector SEL1 of the edge amount adder circuit 103 of the edge emphasis circuit 27b shown in FIG. 8 outputs the edge emphasis signal Em of magenta selected according to the edge emphasis amount selection signal 122. The selector SEL1 of the edge amount adder circuit 103 of the edge emphasis circuit 27c shown in FIG. 8 outputs the edge emphasis signal Ey of yellow selected according to the edge emphasis amount selection signal 122.

In the edge amount controller 130, the OR gates 109 to 112 respectively outputs signals 118 to 121 to respective input terminals I1 to I4 of the priority encoder 113, in response to the saturation signals 127 to 129. Further, the above-mentioned detection signal E for representing an area in which the edge emphasis amount is to be set so as to be larger than that of the other area is inputted to a control input terminal E of the priority encoder 113.

The priority encoder 113 outputs the edge emphasis amount selection signal 122 to the selection signal terminals SEL of the selectors SEL1 of the edge amount adder circuits 103 of respective edge emphasis circuits 27a to 27c, in response to the detection signal E and the output signals of the OR gates 109 to 112.

FIG. 16 is a diagram showing relationship between input signals 118 to 121 and E and the output signal 122 of the priority encoder 122 shown in FIG. 15.

As shown in FIG. 16, in the case that the detection signal E has the high level, when the priority encoder 113 outputs the edge amount selection signal 122 so that the selector 108 selects the image signal inputted to one input terminal i(n) (n=1, 2, 3, 4) thereof, wherein n is the maximum number among the number or numbers m of the input terminal or terminals I(m) (m=1, 2, 3, 4) of the priority encoder 113 to which the low level signal or signals are inputted. On the other hand, in the case that the detection signal E has the low level, when the priority encoder 113 outputs the edge amount selection signal 122 so that the selector 108 selects the image signal inputted to one input terminal i(n) (n=1, 2, 3) thereof, wherein n is the maximum number among the number or numbers m of the input terminal or terminals I(m) (m=1, 2, 3) of the priority encoder 113 to which the low level signal or signals are inputted. Further, when all the signals inputted to the input terminals I1 to I4 have the high level, the priority encoder 113 outputs the edge amount selection signal 122 independent of the detection signal E so that the selector 108 selects the image signal inputted to the input terminal i0.

As described above, since the edge emphasis amount is suppressed so that the edge emphasis signals Ec, Em and Ey for which the edge emphasis process has been performed are not depart from the predetermined dynamic range of the image signal, a colored fine line and a colored edge can be prevented from becoming achromatic color images. In particular, in the case of a document including a map having many colored fine lines, the document is preferably copied with a relatively larger edge emphasis amount. In this case, the colored fine lines of the map can be prevented from being reproduced as black lines.

Figure 17:
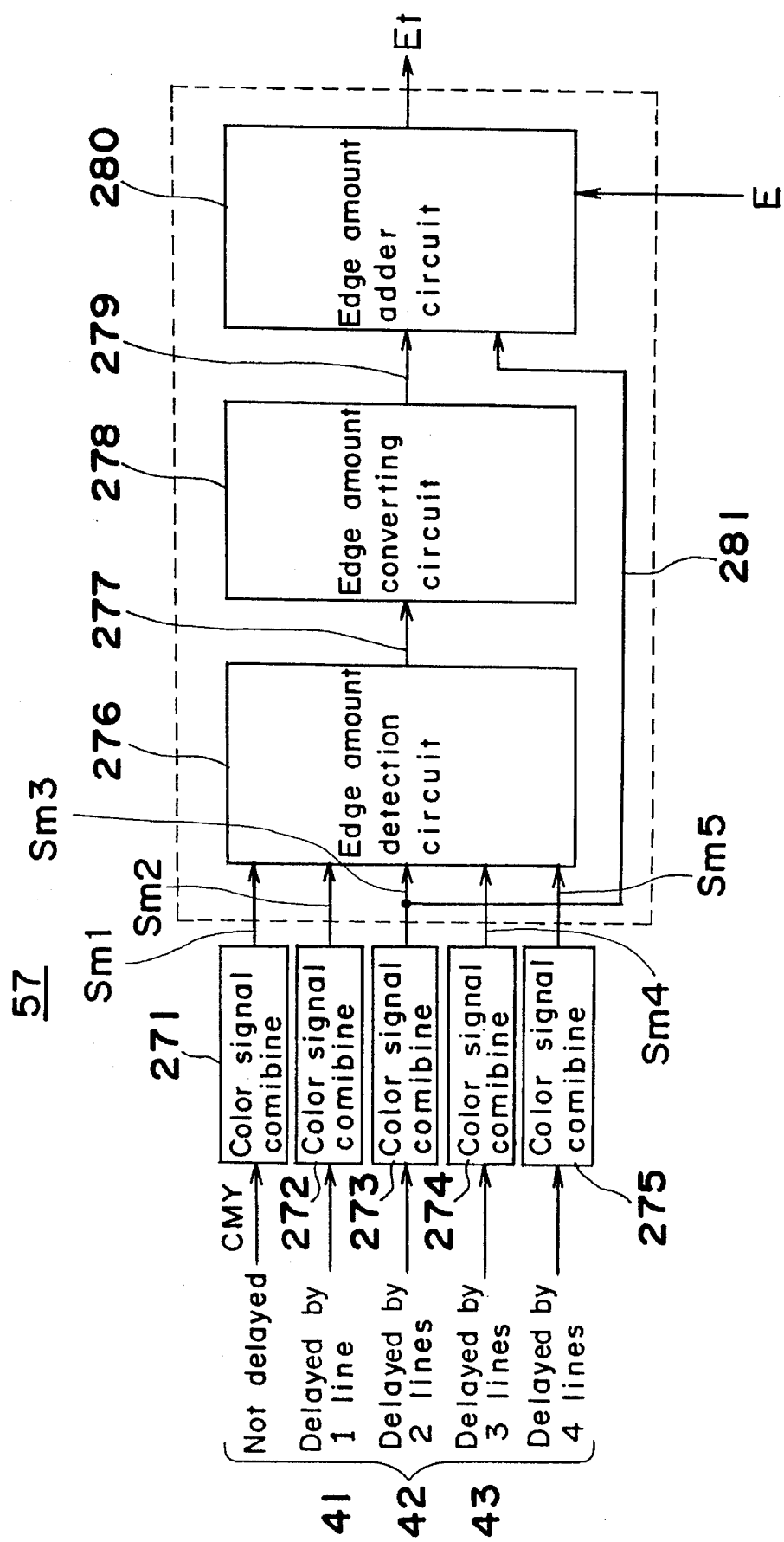

FIG. 17 is a schematic block diagram showing the monochromatic signal edge emphasis circuit 57 shown in FIG. 4a.

Referring to FIG. 17, the monochromatic signal edge emphasis circuit 57 comprises color signal combining circuits 271 to 275, an edge amount detection circuit 276, an edge amount converting circuit 278 and an edge amount adder circuit 280.

The color signal combining circuit 271 combines the image signals 41 to 43 of C, M and Y which have been delayed by no delay time in the line memory 26 using a predetermined equation, and outputs a combined monochromatic signal Sm1 to the edge amount detection circuit 276. The following predetermined equation is preferably used for combining the image signals 41 to 43 of C, M and Y:

$$Sm1 = Coa \cdot C + Cob \cdot M + Coc \cdot Y \tag{2}$$

where Coa, Cob and Coc are predetermined coefficients.

Similarly, the color signal combining circuit 272 combines the image signals 41 to 43 of C, M and Y which have been delayed by a delay time of one scan line in the line memory 26 using the predetermined equation, and outputs a combined monochromatic signal Sm2 to the edge amount detection circuit 276. The color signal combining circuit 273 combines the image signals 41 to 43 of C, M and Y which have been delayed by a delay time of two scan lines in the line memory 26 using the predetermined equation, and outputs a combined monochromatic signal Sm3 to the edge amount detection circuit 276. The color signal combining circuit 274 combines the image signals 41 to 43 of C, M and Y which have been delayed by a delay time of three scan lines in the line memory 26 using the predetermined equation, and outputs a combined monochromatic signal Sm4 to the edge amount detection circuit 276. The color signal combining circuit 275 combines the image signals 41 to 43 of C, M and Y which have been delayed by a delay time of four scan line in the line memory 26 using the predetermined equation, and outputs a combined monochromatic signal Sm5 to the edge amount detection circuit 276.

The edge amount detection circuit 276 is constituted in a manner to similar to that of the edge amount detection circuit 101 shown in FIG. 8. The edge amount detection circuit 276 scans the inputted monochromatic signals Sm1 to Sm5 within the 5×5 pixel window W5, and then, outputs an edge amount signal 277 to the edge amount converting circuit 278. The edge amount converting circuit 278 is constituted in a manner to similar to that of the edge amount converting circuit 102 shown in FIG. 8. The edge amount converting circuit 278 converts the edge amount signal 277 into a converted edge amount signal 278, and outputs the edge mount signal 278 to the edge amount adder circuit 280.

When the detection signal E has the low level, the edge amount adder circuit 280 adds the converted edge amount signal 279 to the monochromatic signal Sm3 or 281 of the specified pixel P0, and outputs the edge emphasis signal Et having a level of the addition result thereof. On the other hand, when the detection signal E has the high level, the edge amount adder circuit 280 adds twice the converted edge amount signal 279 to the monochromatic signal Sm3 or 281 of the specified pixel P0, and outputs the edge emphasis signal Et having a level of the addition result thereof.

Figure 18:
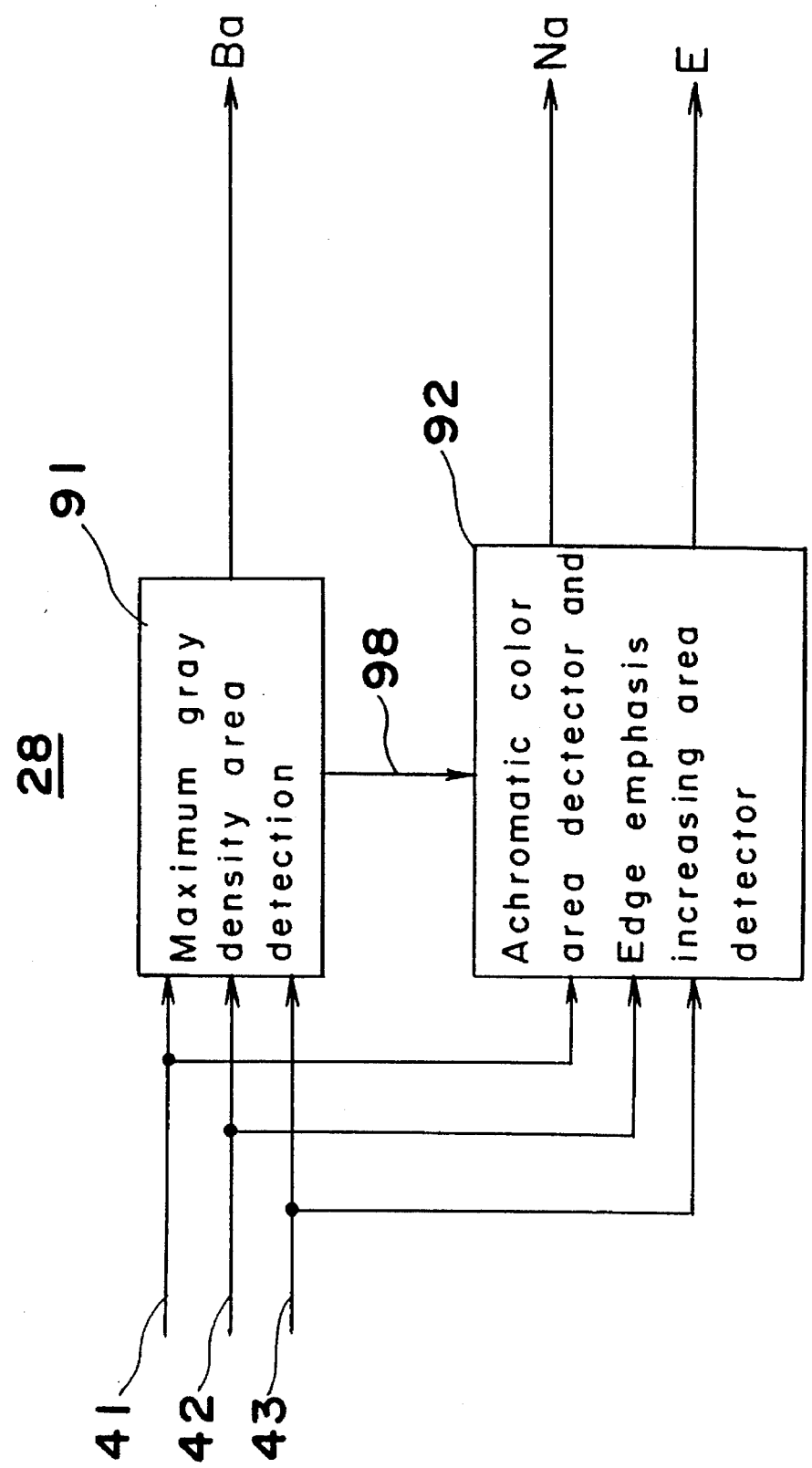

FIG. 18 is a schematic block diagram showing the area judgment circuit 28 shown in FIG. 4a.

Referring to FIG. 18, the area judgment circuit 28 comprises a maximum gray density area detection circuit 91 and a circuit 92 including an achromatic color area detector and an edge emphasis increasing area detector. The maximum gray density area detection circuit 28 generates a maximum gray density area detection signal Ba and an achromatic color judgment signal 98, in response to the image signals 41 to 43, each of which is composed of the image signals having been delayed by different delay times as described above. The circuit 92 including the achromatic color area detector and the edge emphasis increasing area detector generates an achromatic color area detection signal Na and an edge emphasis increasing area detection signal E, in response to the the above image signals 41 to 43 and the achromatic color judgment signal 98.

Figure 19:
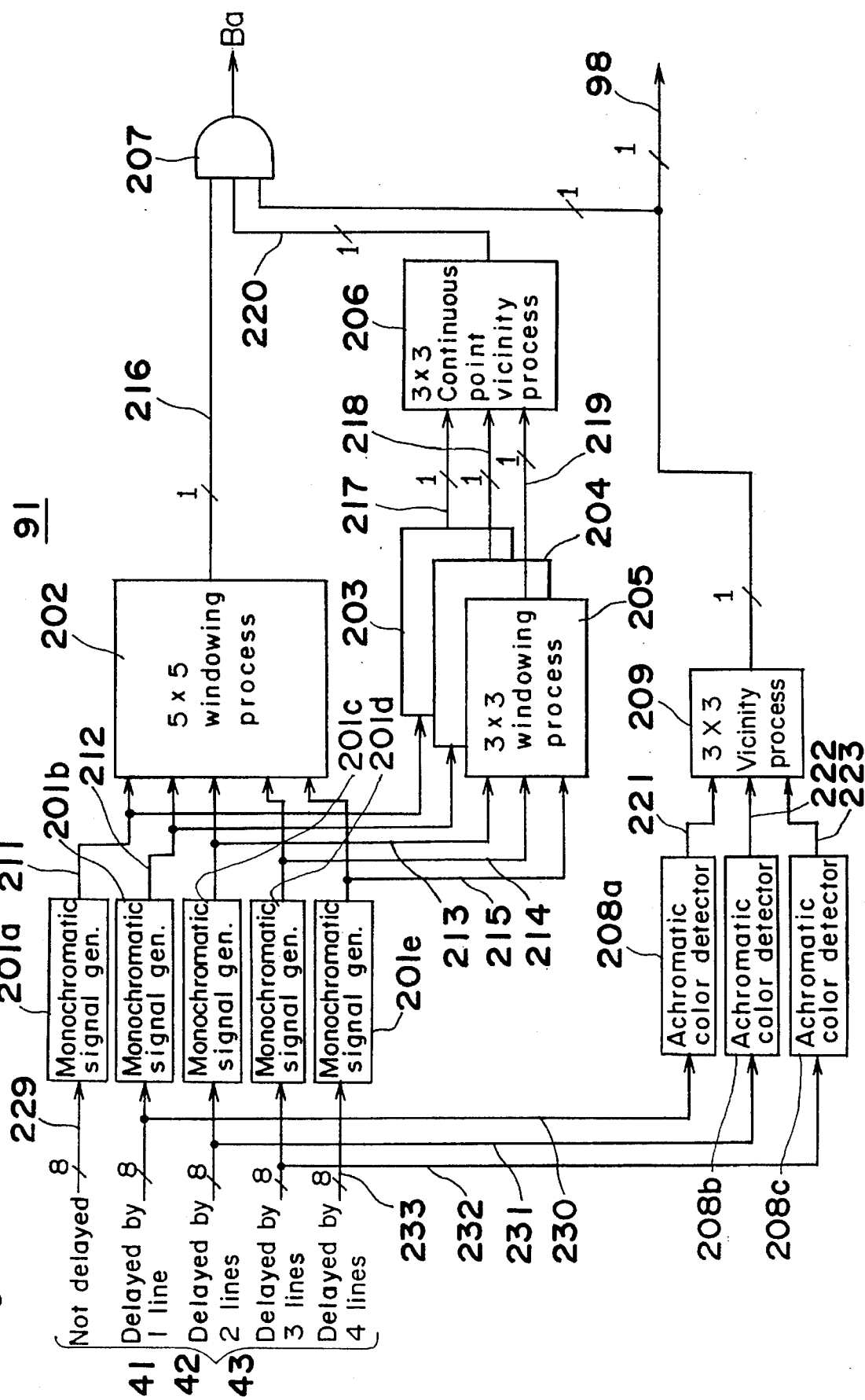
FIG. 19 is a schematic block diagram showing a maximum gray density area detection circuit shown in FIG. 18.

FIG. 19 is a schematic block diagram showing the maximum gray density area detection circuit 91 shown in FIG. 18.

Referring to FIG. 19, the maximum gray density area detection circuit 91 comprises five monochromatic signal generators 201a to 201e, a 5×5 windowing process circuit 202, three 3×3 windowing process circuits 203 to 205, a 3×3 continuous point vicinity process circuit 206, an AND gate 207, three achromatic color detectors 208a to 208c, and a 3×3 vicinity process circuit 209.

The three image signals 229 of respective image signals 41 to 43 of C, M and Y which have been delayed by no delay time are inputted to the monochromatic signal generator 210a. The three image signals 230 of respective image signals 41 to 43 of C, M and Y which have been delayed by a delay time of one scan line are inputted to the monochromatic signal generator 210b and the achromatic color detector 208a. The three image signals 231 of respective image signals 41 to 43 of C, M and Y which have been delayed by a delay time of two scan lines are inputted to the monochromatic signal generator 210c and the achromatic color detector 208b. The three image signals 232 of respective image signals 41 to 43 of C, M and Y which have been delayed by a delay time of three scan lines are inputted to the monochromatic signal generator 210d and the achromatic color detector 208c. The three image signals 233 of respective image signals 41 to 43 of C, M and Y which have been delayed by a delay time of four scan lines are inputted to the monochromatic signal generator 210e.

The monochromatic signal generator 210a combines the inputted three image signals 229, and outputs the combined monochromatic signal 211 corresponding to one density to the 5×5 windowing process circuit 202 and the 3×3 windowing process circuit 203. The monochromatic signal generator 210b combines the inputted three image signals 230, and outputs the combined monochromatic signal 212 corresponding to one density to the 5×5 windowing process circuit 202 and the 3×3 windowing process circuits 203 and 204. The monochromatic signal generator 210c combines the inputted three image signals 231, and outputs the combined monochromatic signal 213 corresponding to one density to the 5×5 windowing process circuit 202 and the 3×3 windowing process circuits 203 to 205. The monochromatic signal generator 210d combines the inputted three image signals 232, and outputs the combined monochromatic signal 214 corresponding to one density to the 5×5 windowing process circuit 202 and the 3×3 windowing process circuits 204 and 205. The monochromatic signal generator 210e combines the inputted three image signals 233, and outputs the combined monochromatic signal 215 corresponding to one density to the 5×5 windowing process circuit 202 and the 3×3 windowing process circuit 205.

The 5×5 windowing process circuit 202 scans the inputted monochromatic signals 211 to 215, performs a predetermined 5×5 windowing process therefor which is described in detail later, and outputs the processed signal 216 of one bit to the first input terminal of the AND gate 207.

The 3×3 windowing process circuit 203 scans the inputted monochromatic signals 211 to 213, performs a predetermined 3×3 windowing process therefor which is described in detail later, and outputs the processed signal 217 of one bit to the 3×3 continuous point vicinity process circuit 206. The 3×3 windowing process circuit 204 scans the inputted monochromatic signals 212 to 214, performs the 3×3 windowing process therefor, and outputs the processed signal 218 of one bit to the 3×3 continuous point vicinity process circuit 206. The 3×3 windowing process circuit 205 scans the inputted monochromatic signals 213 to 215, performs the 3×3 windowing process therefor, and outputs the processed signal 219 of one bit to the 3×3 continuous point vicinity process circuit 206.

The 3×3 continuous point vicinity process circuit 206 scans the windowing-processed signals 217 to 219 which have been delayed by different delay times within a 3×3, pixel window W3. When there are at least two pixels, each pixel having a density larger than a predetermined density, which are continuously positioned, the 3×3 continuous point vicinity process circuit 206 outputs a high level signal 220 of one bit to the second input terminal of the AND gate 207. Otherwise, the 3×3 continuous point vicinity process circuit 206 outputs a low level signal 220 thereto.

In response to the three image signals 230 of C, M and Y which have been delayed by a delay time of one scan line, the achromatic color detector 208a judges whether or not the difference between the maximum value and the minimum value among the density levels of the image signals 230 is equal to or smaller than a predetermined value. If the difference between the maximum value and the minimum value among the density levels of the image signals 230 is equal to or smaller than a predetermined value, the achromatic color detector 208a outputs a high level achromatic color detection signal 221 to the 3×3 vicinity process circuit 209. Otherwise, the achromatic color detector 208a outputs a low level achromatic color detection signal 221 thereto.

Similarly, in response to the three image signals 231 of C, M and Y which have been delayed by a delay time of two scan lines, the achromatic color detector 208b outputs a level achromatic color detection signal 222 to the 3×3 vicinity process circuit 209. In response to the three image signals 232 of C, M and Y which have been delayed by a delay time of three scan lines, the achromatic color detector 208c outputs a level achromatic color detection signal 223 to the 3×3 vicinity process circuit 209.

The 3×3 vicinity process circuit 209 scans the inputted achromatic color detection signals 221 to 223 within the 3×3 pixel window W3, and judges whether or not all the nine achromatic color detection signals 221 to 223 of the nine pixels which are positioned within the 3×3 pixel window W3 have the high level. If all the nine achromatic-color detection signals 221 to 223 have the high level, the 3×3 vicinity process circuit 209 outputs a high level achromatic color judgment signal 98 to the third input terminal of the AND gate 207 and the circuit 92. Otherwise, the 3×3 vicinity process circuit 209 outputs a low level achromatic color judgment signal 98 thereto.

Furthermore, the AND gate 207 calculates the logical product of the processed signals 216 and 220 and the achromatic color judgment signal 98, and outputs a maximum gray density area detection signal Ba having a level of the logical product thereof.

Figure 20:
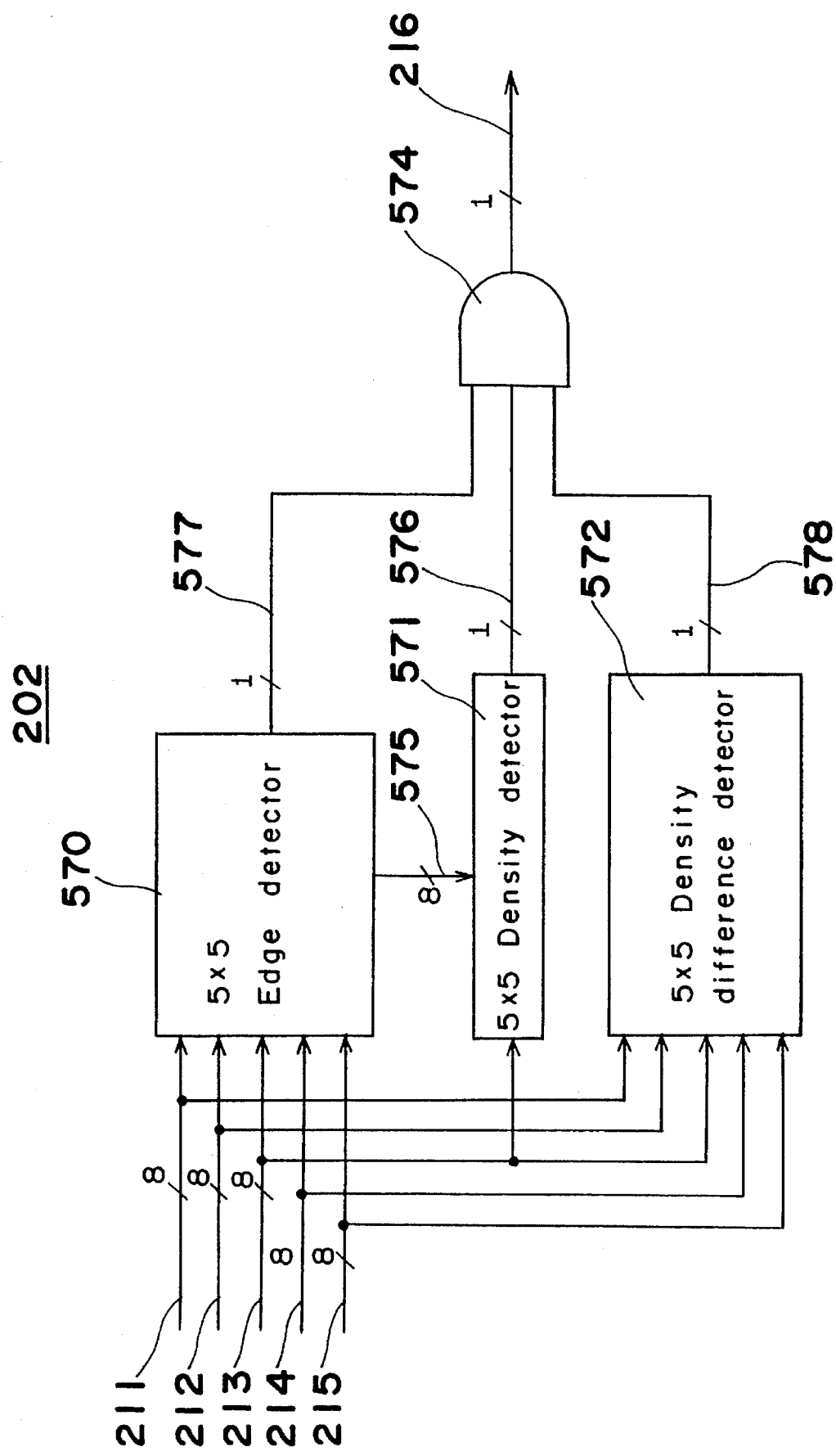
FIG. 20 is a schematic block diagram showing a 5×5 windowing process circuit shown in FIG. 19.

FIG. 20 is a schematic block diagram showing the 5×5 windowing process circuit 202 shown in FIG. 19.

Referring to FIG. 20, the 5×5 windowing process circuit 202 comprises a 5×5 edge detector 570, a 5×5 density detector 571, a 5×5 density difference detector 572, and an AND gate 574.

In response to the monochromatic signals 211 to 215 which have been delayed by different delay times, the 5×5 edge detector 570 scans the inputted monochromatic signals 211 to 215 within the 5×5 pixel window W5 in the center of which the specified pixel P0 is positioned, outputs a 5×5 edge detection signal 577 of one bit to the first input terminal of the AND gate 574, and also outputs a 5×5 edge component signal 575 of eight bits to the 5×5 density detector 571. In response to the monochromatic signal 213 of the specified pixel P0 and the 5×5 edge component signal 575, the 5×5 density detector 571 outputs a density detection signal 576 of one bit of the specified pixel P0 to the second input terminal of the AND gate 574. In response to the monochromatic signals 211 to 215 which have been delayed by different delay times, the 5×5 density difference detector 572 scans these monochromatic signals 211 to 215 within the 5×5 pixel window W5, and outputs a 5×5 density difference detection signal 578 of one bit to the third input terminal of the AND gate 574. The AND gate 574 calculates the logical product of the 5×5 edge detection signal 577, the 5×5 density detection signal 576 and the 5×5 density difference detection signal 578, and outputs the processed signal 216 for which the 5×5 windowing process has been performed.

Figure 21:
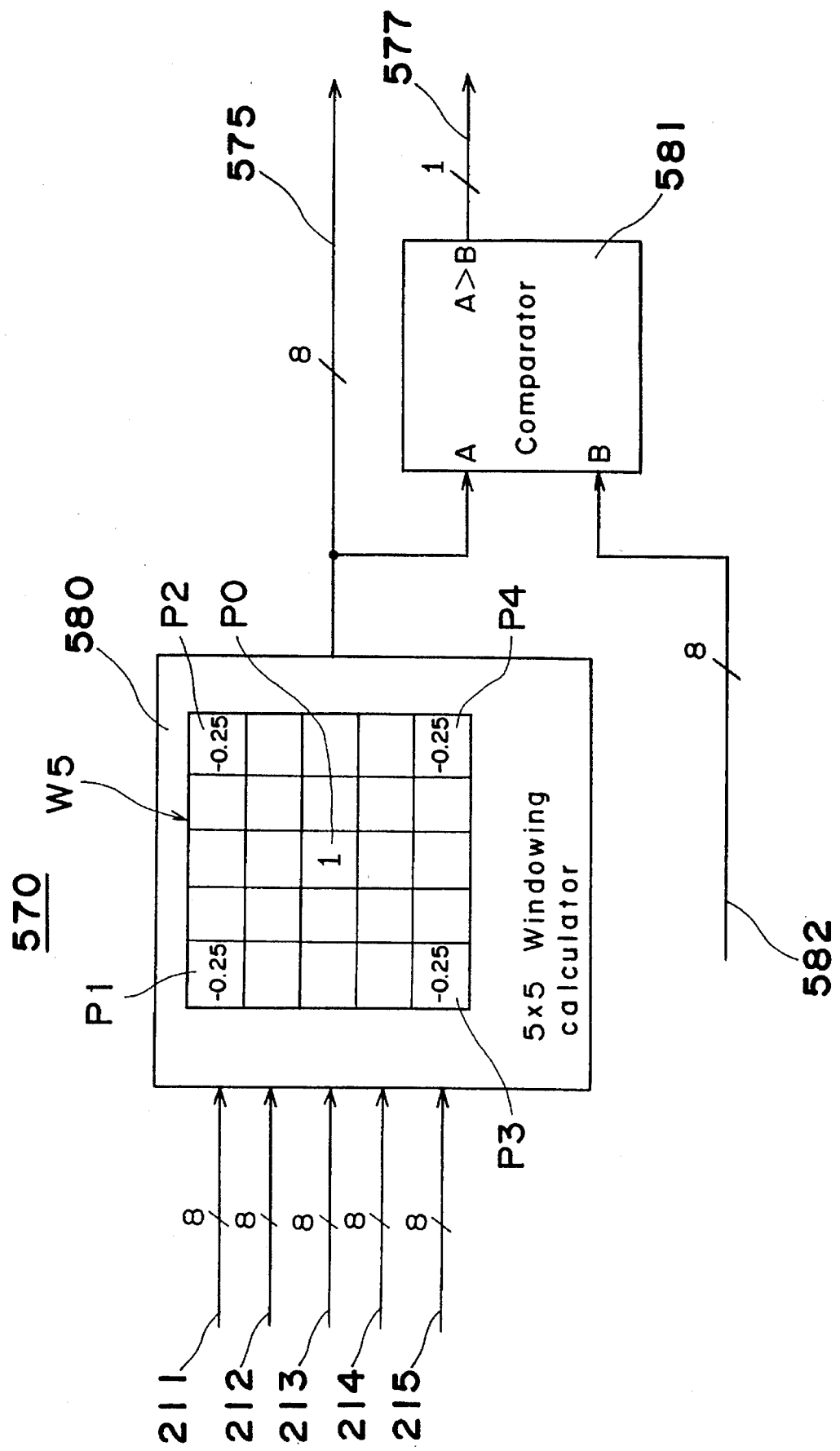
FIG. 21 is a schematic block diagram showing a 5×5 edge detector shown in FIG. 20.

FIG. 21 is a schematic block diagram showing the 5×5 edge detector 570 shown in FIG. 20.

Referring to FIG. 21, the 5×5 edge detector 570 comprises a 5×5 windowing calculator 580 and a comparator 581. In response to the monochromatic signals 211 to 215 which have been delayed by different delay times, the 5×5 windowing calculator 580 scans these monochromatic signals 211 to 215 within the 5×5 pixel window W5, adds a product of (−1) and a quarter of the sum of the levels of the monochromatic signals of the peripheral pixels P1 to P4 which are positioned at the four corners of the 5×5 pixel window W5, to the level of the monochromatic signal of the specified pixel P0 which is positioned in the center thereof, and outputs the 5×5 edge component signal 575 of eight bits having a level of the addition result. The comparator 581 compares the level of the above-mentioned 5×5 edge component signal 575 with a predetermined threshold value of a signal 293 which is inputted from the controller 40 for controlling the digital copying machine. If the level of the 5×5 edge component signal 575 is larger than the above-mentioned predetermined threshold value, the comparator 581 outputs a high level 5×5 edge detection signal 577. Otherwise, the comparator 581 outputs a low level 5×5 edge detection signal 577.

Figure 22:
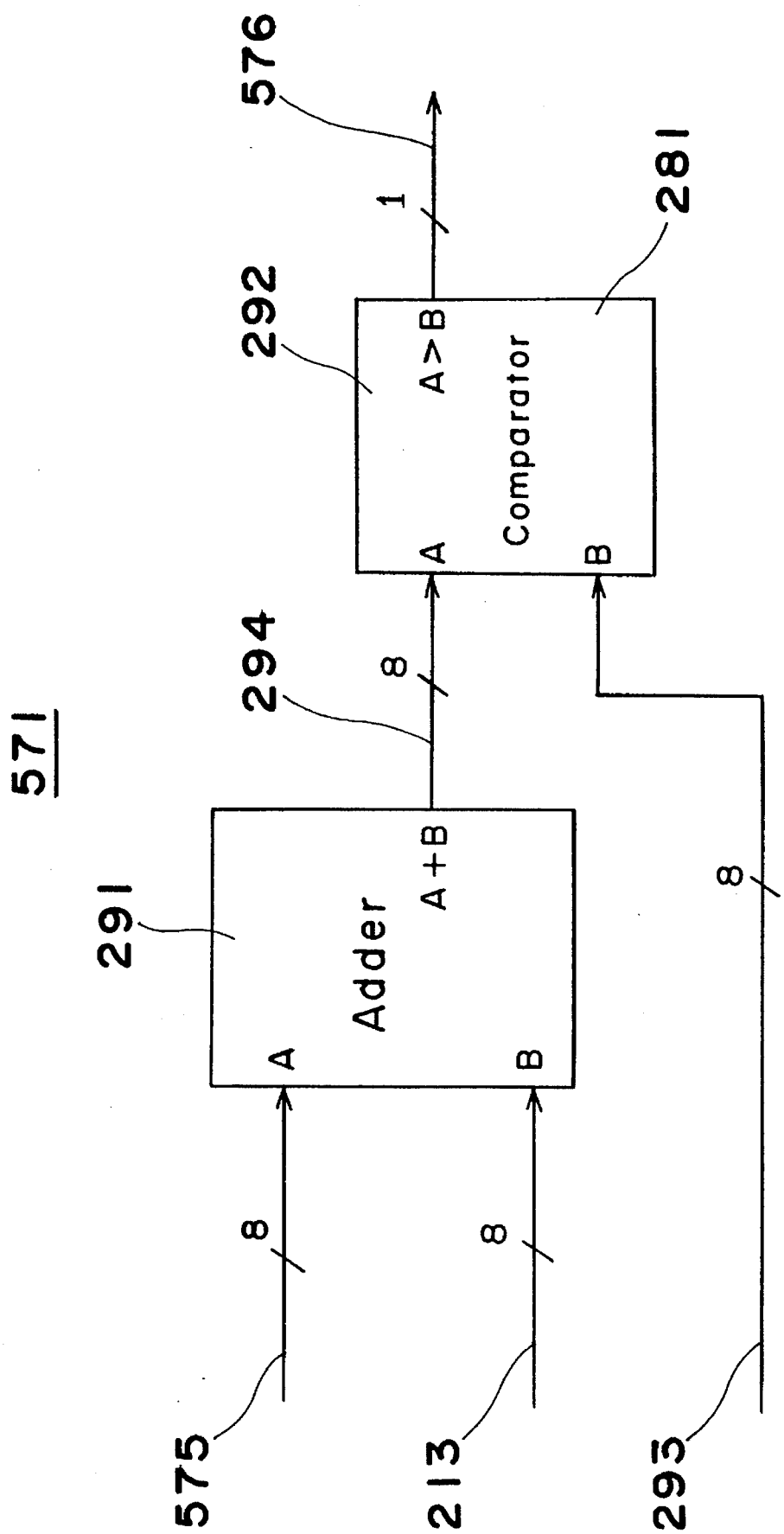
FIG. 22 is a schematic block diagram showing a 5×5 density detector shown in FIG. 20.

FIG. 22 is a schematic block diagram showing the 5×5 density detector 571 shown in FIG. 20.

Referring to FIG. 22, the 5×5 density detection circuit 571 comprises an adder 291 and a comparator 292. The adder 291 adds the 5×5 edge component signal 575 to the monochromatic signal 213 of the specified pixel P0, and outputs an edge component addition signal 294 having a level of the addition result to the comparator 292. The comparator 292 compares the level of the above-mentioned edge component addition signal 294 with a predetermined threshold value which is inputted from the controller 40 for controlling the digital copying machine. If the level of the edge component addition signal 294 is larger than the above-mentioned threshold value, the comparator 292 outputs a high level 5×5 edge detection signal 576. Otherwise. the comparator 292 outputs a low level 5×5 edge detection signal 576.

Figure 23:
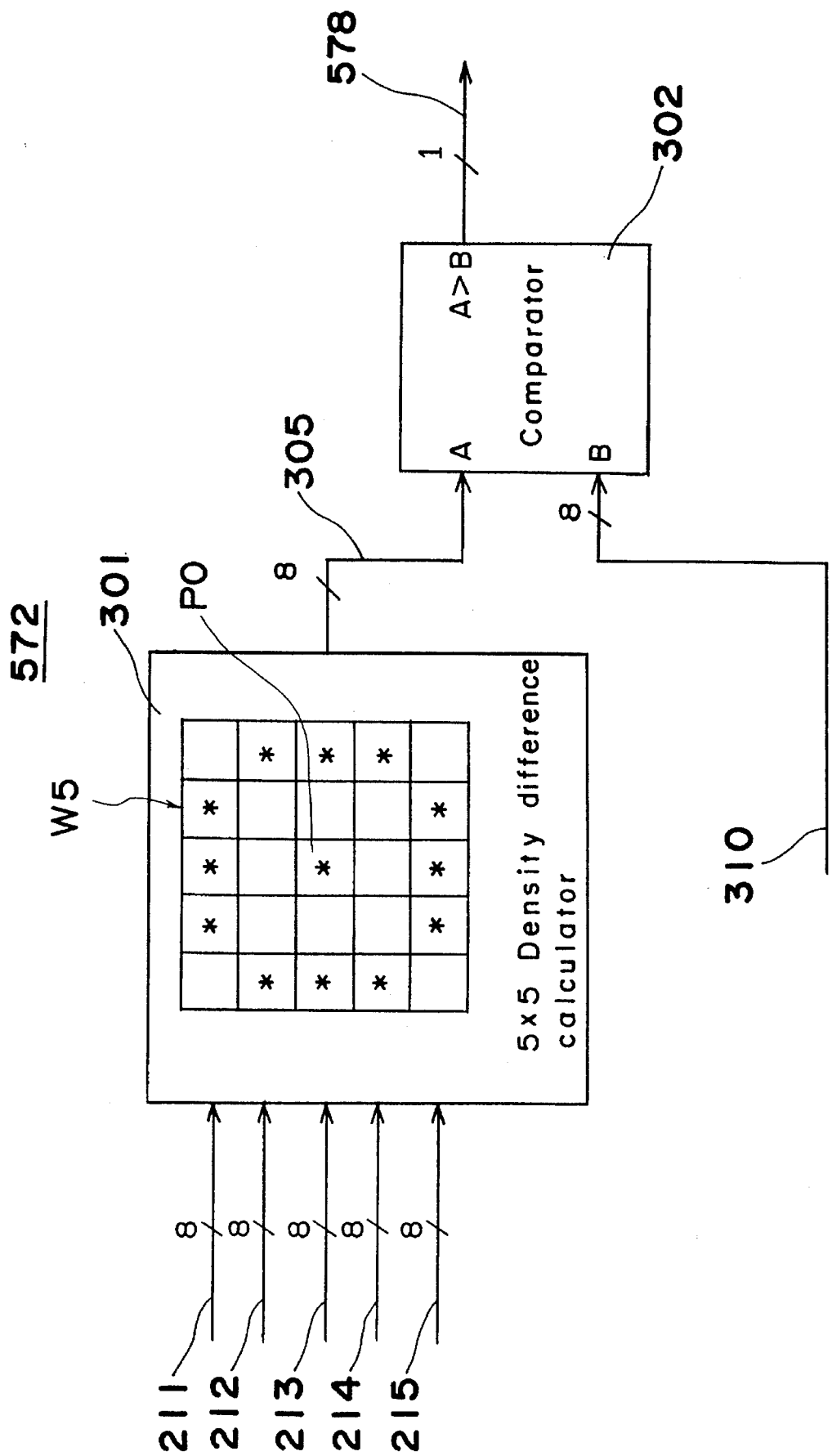
FIG. 23 is a schematic block diagram showing a 5×5 density difference detector shown in FIG. 20.

FIG. 23 is a schematic block diagram showing the 5×5 density difference detector 572 shown in FIG. 20.

Referring to FIG. 23, the 5×5 density difference detector 572 comprises a 5×5 density difference calculator 301 and a comparator 302. In response to the monochromatic signals 211 to 215 which have been delayed by different delay times, the 5×5 density difference calculator 301 scans these monochromatic signals 211 to 215 within the 5×5 pixel window W5 having the specified pixel P0, calculates the difference between the maximum value and the minimum value among the levels of the monochromatic signals of the pixels which are located at positions represented by asterisks * (referred to as asterisked pixels hereinafter) as shown in FIG. 23, and outputs a 5×5 monochromatic density difference signal 305 having a level of the calculated difference to the comparator 302. In the 5×5 pixel window W5, the above-mentioned asterisked pixels are located at the center position thereof, the middle three positions on the top scan line, the middle three positions on the bottom scan line, the middle three positions on the leftmost row and the middle three positions on the rightmost row, respectively.

The comparator 302 compares the monochromatic density difference signal 305 of the specified pixel P0 with a predetermined threshold value of a signal 310 which is inputted from the controller 40 for controlling the digital copying machine. If the density difference signal 305 of the specified pixel P0 is larger than the predetermined threshold value, the comparator 302 outputs a high level density difference detection signal 578. Otherwise, the comparator 302 outputs a low level density difference detection signal 578.

Figure 24:
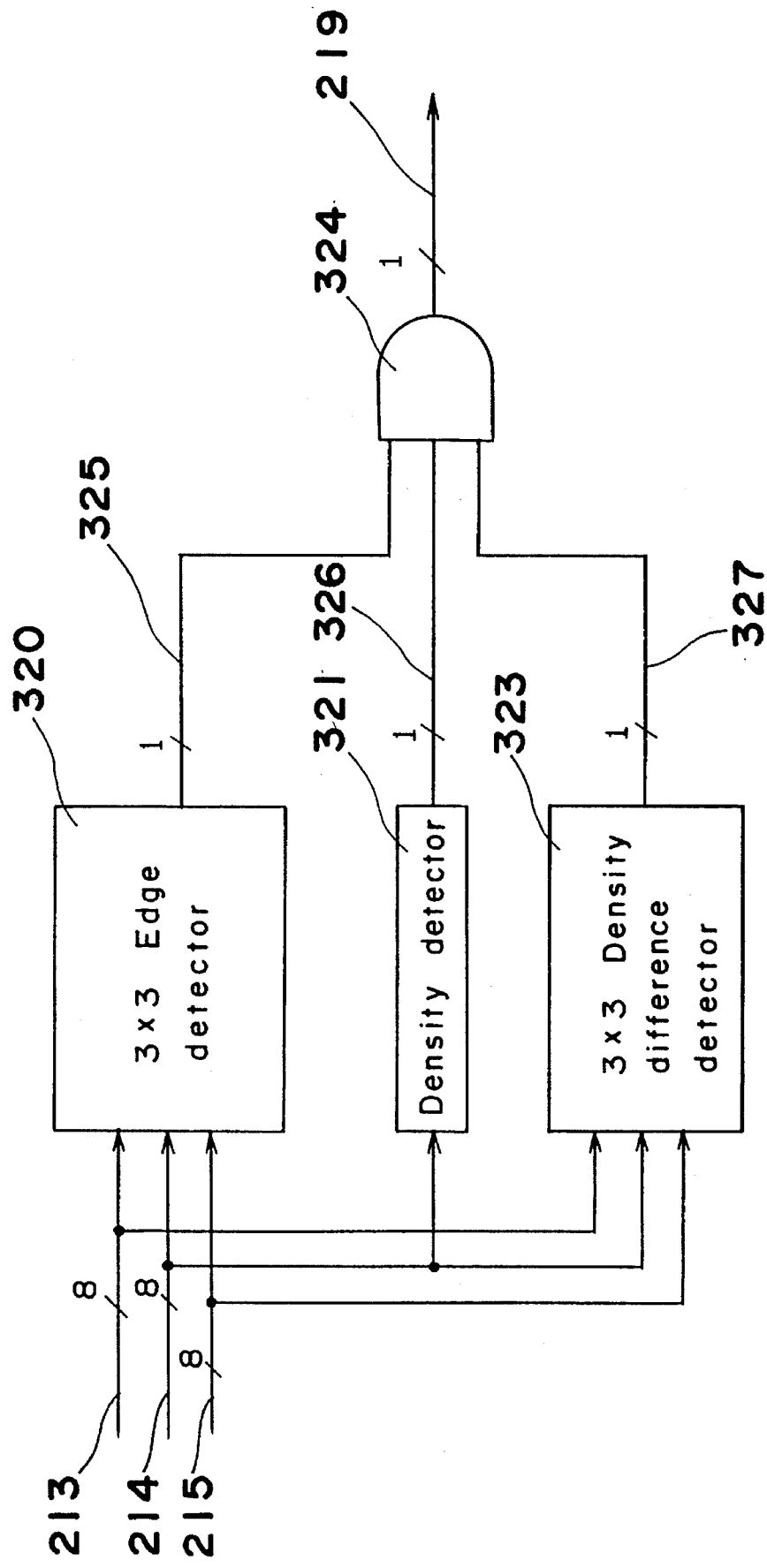
FIG. 24 is a schematic block diagram showing a 3×3 windowing process circuit shown in FIG. 19.

FIG. 24 is a schematic block diagram showing the 3×3 windowing process circuit 205 shown in FIG. 19.

Referring to FIG. 24, the 3×3 windowing process circuit 205 comprises a 3×3 edge detector 320, a density detector 321, a 3×3 density difference detector 323, and an AND gate 324. In response to the monochromatic signals 213 to 215, the 3×3 edge detector 320 scans these monochromatic signals 213 to 215 within the 3×3 pixel window W3 in the center of which the specified pixel P0 is positioned, and outputs a 3×3 edge detection signal 325 of one bit to the first input terminal of the AND gate 324. In response to the monochromatic signal 213, the density detector 321 outputs a density detection signal 326 of one bit of the specified pixel P0 to the second input terminal of the AND gate 324. In response to the monochromatic signals 213 to 215, the 3×3 density difference detector 323 scans these monochromatic signals 213 to 215 within the 3×3 pixel window W3, and outputs a 3×3 density difference detection signal 327 of one bit to the third input terminal of the AND gate 324. The AND gate 324 calculates the logical product of the 3×3 edge detection signal 325, the density detection signal 326 and the 3×3 density difference detection signal 327, and outputs the processed signal 219 having a level of the calculated result for which the 3×3 windowing process has been performed.

Figure 25:
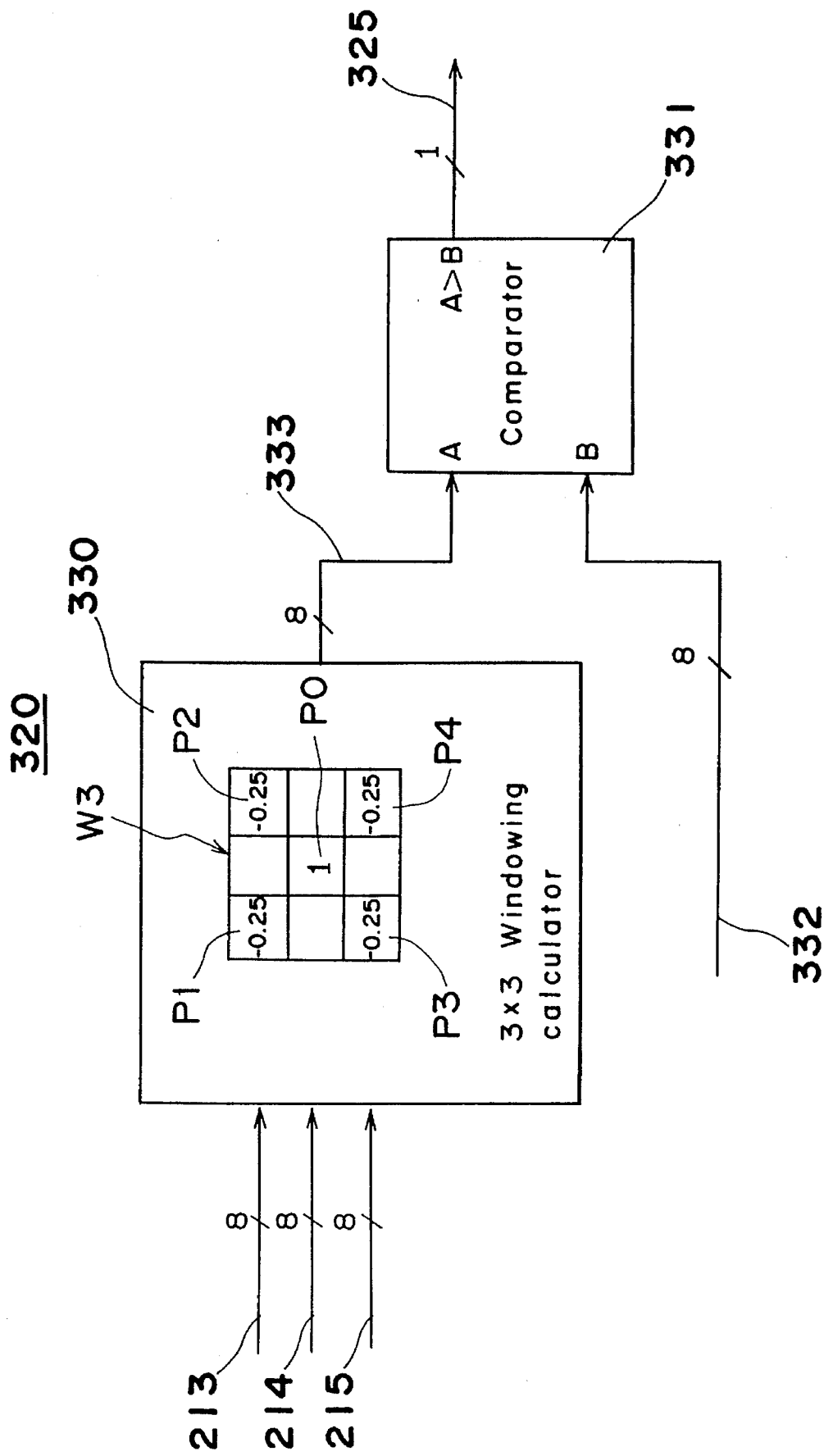
FIG. 25 is a schematic block diagram showing a 3×3 edge detector shown in FIG. 24.

FIG. 25 is a schematic block diagram showing the 3×3 edge detector 320 shown in FIG. 24.

Referring to FIG. 25, the 3×3 edge detector 320 comprises a 3×3 windowing calculator 330 and a comparator 331. In response to the monochromatic signals 213 to 215 which have been delayed by different delay times, the 3×3 windowing calculator 330 scans these monochromatic signals 213 to 215 within the 3×3 pixel window W3, adds a product of (−1) and a quarter of the sum of the levels of the monochromatic signals of the peripheral pixels P1 to P4 which are positioned at the four corners of the 3×3 pixel window W3, to the level of the monochromatic signal of the specified pixel P0 which is positioned in the center thereof, and outputs the 3×3 edge component signal 333 of eight bits having a level of the addition result to the comparator 331. The comparator 331 compares the level of the above-mentioned 3×3 edge component signal 333 with a predetermined threshold value of a signal 332 which is inputted from the controller 40 for controlling the digital copying machine. If the level of the 3×3 edge component signal 333 is larger than the above-mentioned predetermined threshold value, the comparator 331 outputs a high level 3×3 edge detection signal 325. Otherwise, the comparator 331 outputs a low level 3×3 edge detection signal 325.

Figure 26:
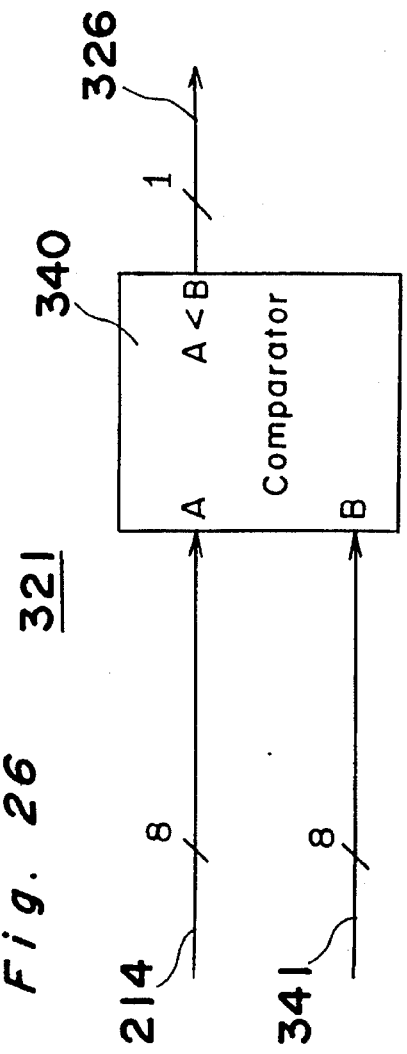
FIG. 26 is a schematic block diagram showing a density detector shown in FIG. 24.

FIG. 26 is a schematic block diagram showing the density detector 321 shown in FIG. 24.

Referring to FIG. 26, the density detector 321 comprises a comparator 340, which compares the level of the monochromatic signal 214 of the specified pixel P0 with a predetermined threshold value of a signal 341 which is inputted from the controller 40 for controlling the digital copying machine. If the level of the monochromatic signal 214 is larger than the above-mentioned predetermined threshold value, the comparator 340 outputs a high level density detection signal 326. Otherwise, the comparator 340 outputs a low level density detection signal 326.

Figure 27:
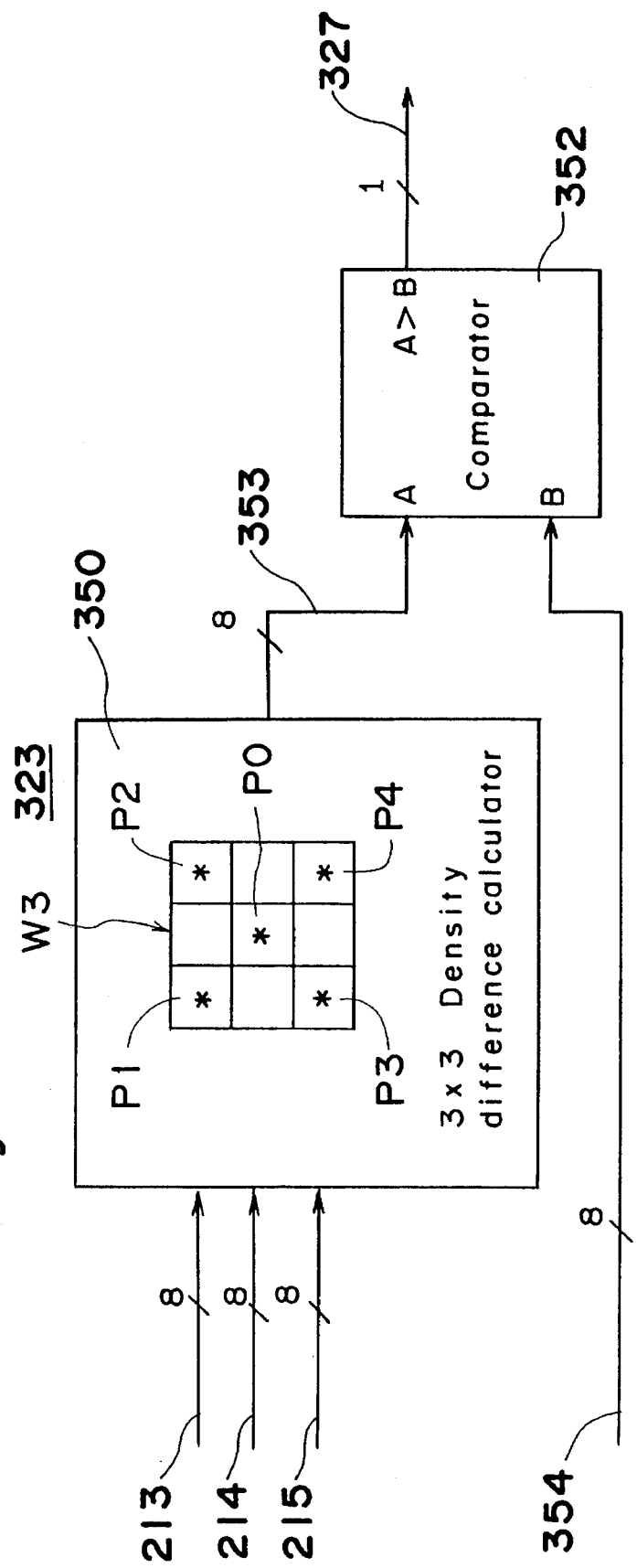
FIG. 27 is a schematic block diagram showing a 3×3 density difference detector shown in FIG. 24.

FIG. 27 is a schematic block diagram showing the 3×3 density difference detector 323 shown in FIG. 24.

Referring to FIG. 27, the 3×3 density difference detector 323 comprises a 3×3 density difference calculator 350 and a comparator 352. In response to the monochromatic signals 213 to 215 which have been delayed by different delay times, the 3×3 density difference detection circuit 350 scans these monochromatic signals 213 to 215 within the 3×3 pixel window W3 having the specified pixel P0, calculates the difference between the maximum value and the minimum value among the levels of the monochromatic signals of the asterisked pixels as shown in FIG. 27, and outputs a 3×3 monochromatic density difference signal 353 having a level of the calculated difference to the comparator 352. In the 3×3 pixel window W3, the above-mentioned asterisked pixels are respectively located at the center position thereof and the four corners thereof, namely, there are the asterisked pixels composed of the specified pixel P0 and the four corner pixels P1 to P4.

The comparator 352 compares the monochromatic density difference signal 353 of the specified pixel P0 with a predetermined threshold value of a signal 354 which is inputted from the controller 40 for controlling the digital copying machine. If the density difference signal 353 of the specified pixel P0 is larger than the predetermined threshold value, the comparator 327 outputs a high level 3×3 density difference detection signal 327. Otherwise, the comparator 302 outputs a low level 3×3 density difference detection signal 327.

In the maximum gray density area density detection circuit 91 constituted as described above, the above-mentioned threshold values are predetermined properly, and an area where an image of a pixel is to be reproduced so as to have the maximum gray density is detected, according to the density of the image signal of the specified pixel P0 for which the edge emphasis process has been performed, the edge component within the 5×5 pixel window W5, the information of the continuity of the edge within the 3×3 pixel window W3 and the information of the achromatic pixel located in the vicinity of the specified pixel P0. Therefore, the above-mentioned maximum gray density area can be detected with the number of errors extremely smaller than that of the conventional apparatus.

The circuit 92 including the achromatic color area detector and the edge emphasis increasing area detector shown in FIG. 18 will be described below with reference to FIG. 28 which is a schematic block diagram thereof.

Figure 28:
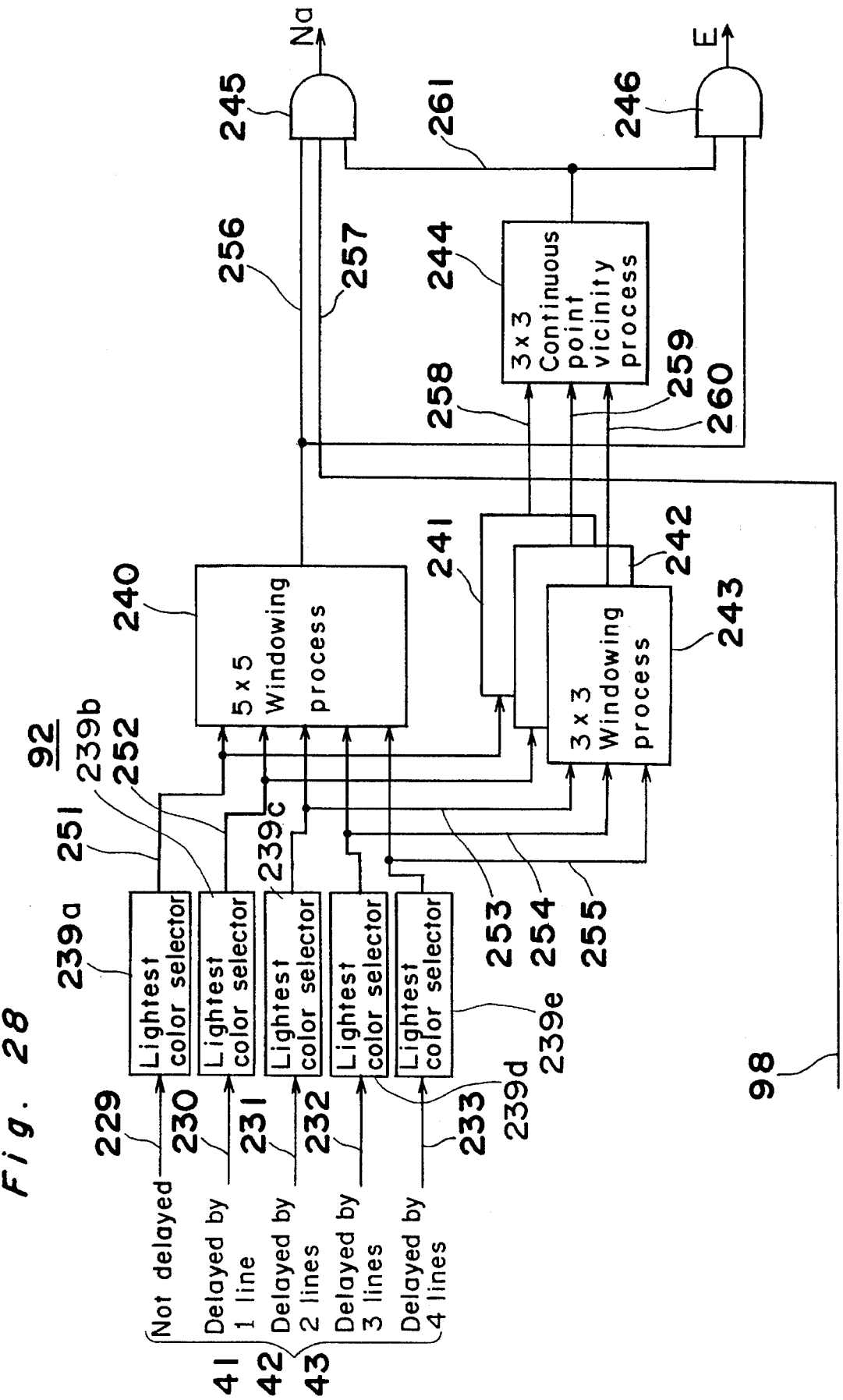
FIG. 28 is a schematic block diagram showing a circuit including an achromatic color area detector and an edge emphasis increasing area detector shown in FIG. 18.

Referring to FIG. 28, the circuit 92 comprises lightest color selectors 239a to 239e, a 5×5 windowing process circuit 240, three 3×3 windowing process circuits 241 to 243, a 3×3 continuous point vicinity process circuit 244, and two AND gates 245 and 246.

The three image signals 229 of respective image signals 41 to 43 of C, M and Y which have been delayed by no delay time are inputted to the lightest color selector 239a. The three image signals 230 of respective image signals 41 to 43 of C, M and Y which have been delayed by a delay time of one scan line are inputted to the lightest color selector 239b. The three image signals 231 of respective image signals 41 to 43 of C, M and Y which have been delayed by a delay time of two scan lines are inputted to the lightest color selector 239c. The three image signals 232 of respective image signals 41 to 43 of C, M and Y which have been delayed by a delay time of three scan lines are inputted to the lightest color selector 239d. The three image signals 233 of respective image signals 41 to 43 of C, M and Y which have been delayed by a delay time of four scan lines are inputted to the lightest color selector 239e.

The lightest color selector 239a selects a signal having the maximum level among the inputted three image signals 229 of C, M and Y, and outputs the selected lightest color signal 251 to the 5×5 windowing process circuit 240 and the 3×3 windowing process circuit 241. The lightest color selector 239b selects a signal having the maximum level among the inputted three image signals 230 of C, M and Y, and outputs the selected lightest color signal 252 to the 5×5 windowing process circuit 240 and the 3×3 windowing process circuits 241 and 242. The lightest color selector 239c selects a signal having the maximum level among the inputted three image signals 231 of C, M and Y, and outputs the selected lightest color signal 253 to the 5×5 windowing process circuit 240 and the 3×3 windowing process circuits 241 to 243. The lightest color selector 239d selects a signal having the maximum level among the inputted three image signals 232 of C, M and Y, and outputs the selected lightest color signal 254 to the 5×5 windowing process circuit 240 and the 3×3 windowing process circuits 242 and 243. The lightest color selector 239e selects a signal having the maximum level among the inputted three image signals 230 of C, M and Y, and outputs the selected lightest color signal 255 to the 5×5 windowing process circuit 240 and the 3×3 windowing process circuit 243.

The 5×5 windowing process circuit 240 scans the inputted lightest color signals 251 to 255, performs a predetermined 5×5 windowing process therefor which is described in detail later, and outputs the processed signal 256 of one bit to the first input terminal of the AND gate 245.

The 3×3 windowing process circuit 241 scans the inputted lightest color signals 251 to 253, performs a predetermined 3×3 windowing process therefor which is described in detail later, and outputs the processed signal 258 of one bit to the 3×3 continuous point vicinity process circuit 244. The 3×3 windowing process circuit 242 scans the inputted lightest color signals 252 to 254, performs the 3×3 windowing process therefor, and outputs the processed signal 259 of one bit to the 3×3 continuous point vicinity process circuit 244. The 3×3 windowing process circuit 243 scans the inputted lightest color signals 253 to 255, performs the 3×3 windowing process therefor, and outputs the processed signal 260 of one bit to the 3×3 continuous point vicinity process circuit 244.

The 3×3 continuous point vicinity process circuit 244 scans the windowing-processed signals 258 to 260 which have been delayed by different delay times within the 3×3 pixel window W3. When there are at least two pixels, each pixel having a density larger than a predetermined density, which are continuously positioned, the 3×3 continuous point vicinity process circuit 244 outputs a high level signal 261 of one bit to the third input terminal of the AND gate 245 and the second input terminal of the AND gate 246. Otherwise, the 3×3 continuous point vicinity process circuit 244 outputs a low level signal 261 thereto.

Furthermore, the AND gate 245 calculates the logical product of the processed signals 256 and 261 and the achromatic color judgment signal 98, and outputs the achromatic color area detection signal Na having a level of the logical product thereof. The AND gate 246 calculates the logical product of the processed signals 256 and 261, and outputs the edge emphasis increasing area detection signal E having a level of the logical product thereof.

Figure 29:
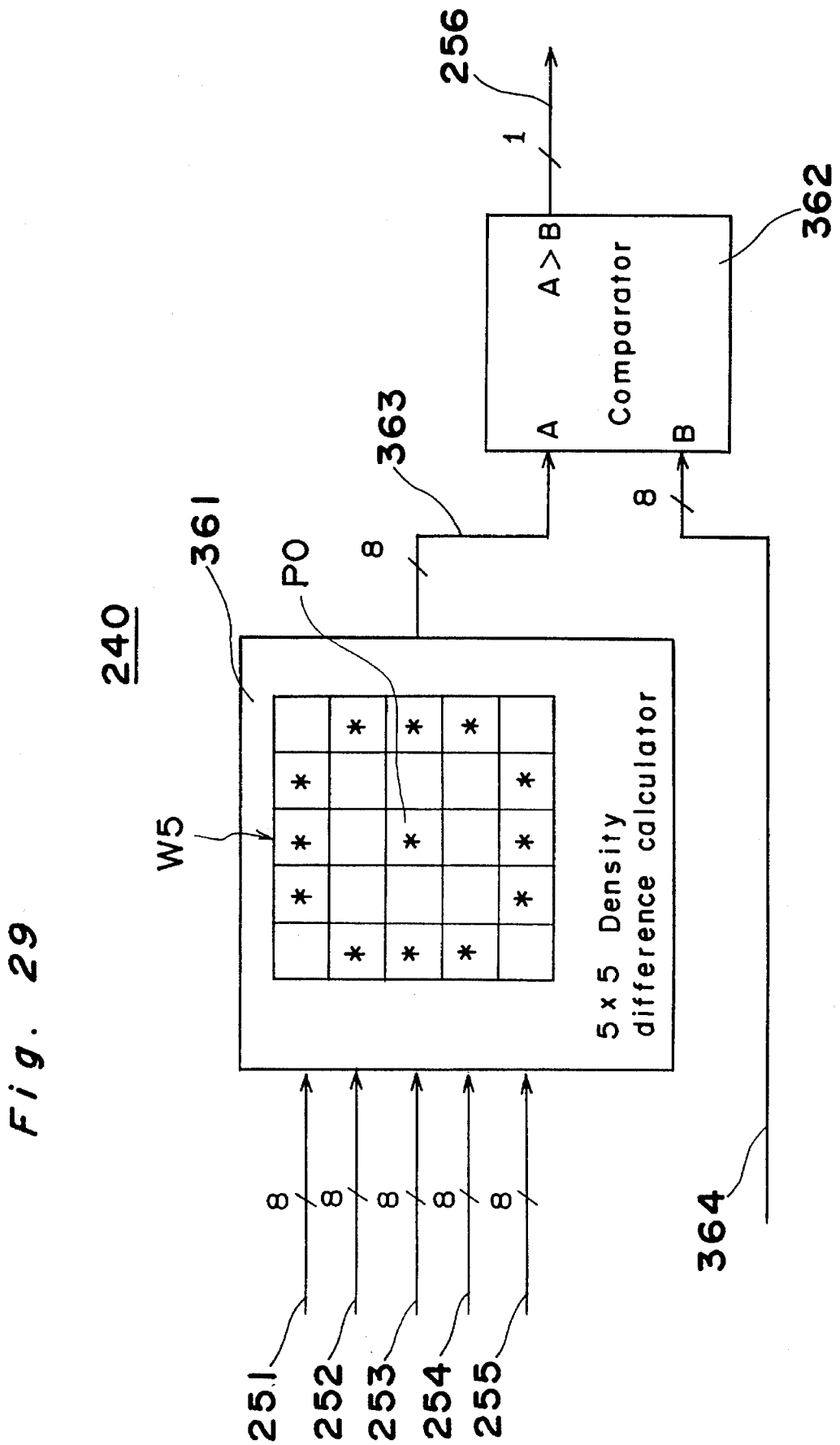
FIG. 29 is a schematic block diagram showing a 5×5 windowing process circuit shown in FIG. 28.

FIG. 29 is a schematic block diagram showing the 5×5 windowing process circuit 240 shown in FIG. 28.

Referring to FIG. 29, the 5×5 windowing process circuit 240 comprises a 5×5 density difference calculator 361 and a comparator 362. In response to the lightest color signals 251 to 255 which have been delayed by different delay times, the 5×5 density difference calculator 361 scans these lightest color signals 251 to 255 within the 5×5 pixel window W5 having the specified pixel P0, calculates the difference between the maximum value and the minimum value among the levels of the lightest color signals 251 to 255 of the asterisked pixels as shown in FIG. 29, and outputs a 5×5 lightest color density difference signal 363 having a level of the calculated difference to the comparator 362. In the 5×5 pixel window W5, the above-mentioned asterisked pixels are located at the center position thereof, the middle three positions on the top scan line, the middle three positions on the bottom scan line, the middle three positions on the leftmost row and the middle three positions on the rightmost row, respectively.

The comparator 362 compares the lightest color density difference signal 363 of the specified pixel P0 with a predetermined threshold value of a signal 364 which is inputted from the controller 40 for controlling the digital copying machine. If the lightest color density difference signal 363 of the specified pixel P0 is larger than the predetermined threshold value, the comparator 362 outputs a high level density difference detection signal 256. Otherwise, the comparator 362 outputs a low level density difference detection signal 256.

Figure 30:
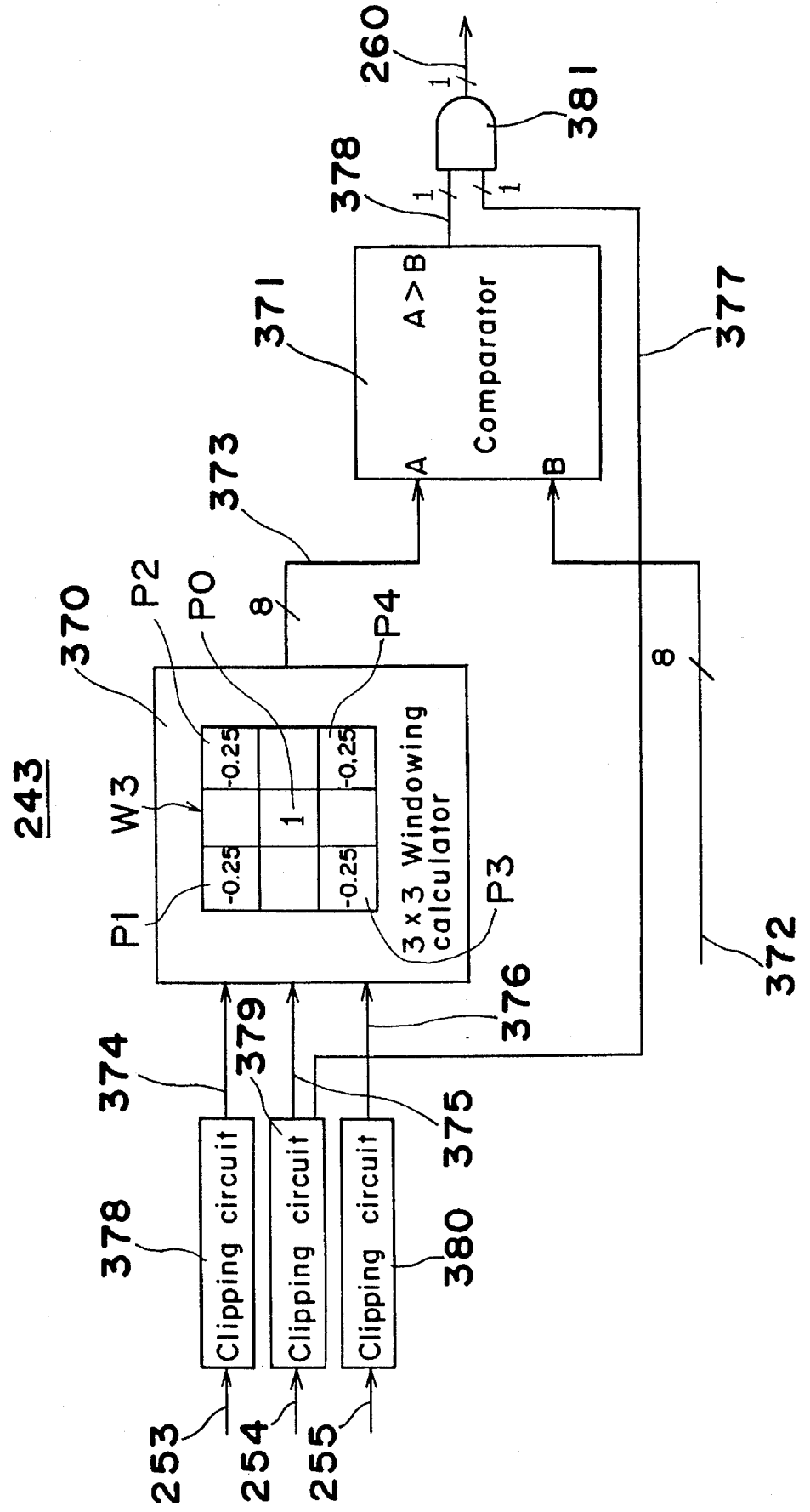
FIG. 30 is a schematic block diagram showing a 3×3 windowing process circuit shown in FIG. 28.

FIG. 30 is a schematic block diagram showing the 3×3 windowing process circuit 243 shown in FIG. 28.

Referring to FIG. 30, the 3×3 windowing process circuit 243 comprises three maximum value clipping circuits 378 to 380, a 3×3 windowing calculator 370, a comparator 371, and an AND gate 381.

In response to the lightest color signal 253, the clipping circuit 378 clips the inputted lightest color signal 253 with a predetermined maximum value which is set by the controller 40 for controlling the digital copying machine, and outputs the clipped lightest color signal 374 to the 3×3 windowing calculator 370. In response to the lightest color signal 254, the clipping circuit 379 clips the inputted lightest color signal 254 with the above-mentioned predetermined maximum value, and outputs the clipped lightest color signal 375 to the 3×3 windowing calculator 370. Further, when the lightest color signal 254 of the specified pixel P0 is clipped with the above-mentioned maximum value, the clipping circuit 379 outputs a high level clip detection signal 377 to the second input terminal of the AND gate 381. Otherwise, the clipping circuit 379 outputs a low level clip detection signal 377 thereto. In response to the lightest color signal 255, the clipping circuit 380 clips the inputted lightest color signal 255 with the above-mentioned predetermined maximum value,-and outputs the clipped lightest color signal 376 to the 3×3 windowing calculator 370.

The 3×3 windowing calculator 370 scans the clipped lightest color signals 374 to 376 within the 3×3 pixel window W3, adds a product of (−1) and a quarter of the sum of the levels of the lightest color signals of the peripheral pixels P1 to P4 which are positioned at the four corners of the 3×3 pixel window W3, to the level of the lightest color signal of the specified pixel P0 which is positioned in the center thereof, and outputs the 3×3 edge component signal 373 of eight bits having a level of the addition result to the comparator 371. The comparator 371 compares the level of the above-mentioned 3×3 edge component signal 373 with a predetermined threshold value of a signal 372 which is inputted from the controller 40 for controlling the digital copying machine. If the level of the 3×3 edge component signal 373 is larger than the above-mentioned predetermined threshold value, the comparator 371 outputs a high level signal 378 to the first input terminal of the AND gate 381. Otherwise, the comparator 331 outputs a low level signal 378 thereto.

The AND gate 260 calculates the logical product of the output signal 378 of the comparator 371 and the clip detection signal 377, and outputs a signal 260 for which the 3×3 windowing process of the process circuit 243 has been performed.

In the circuit 92 including the achromatic color area detector and the edge emphasis increasing area detector which is constituted as described above, the above-mentioned threshold values are predetermined properly, and the achromatic color area and the edge emphasis increasing area are detected, according to the density difference of the lightest color signals obtained by the 5×5 windowing process, the edge component of the lightest color signal which is clipped with the above-mentioned maximum value in the 3×3 windowing process with respect to the vicinity of the specified pixel P0, and the information of the achromatic color pixel located in the vicinity of the specified pixel P0. Therefore, the achromatic color area and the edge emphasis increasing area can be detected with the number of errors extremely smaller than that of the conventional apparatus. Further, since the clipped lightest color signals are used in the above-mentioned 3×3 windowing process, a boundary area between a light color image located in the vicinity of a black character and an image slightly darker than the light color image can be certainly detected.

The maximum gray density area, the achromatic color area and the edge emphasis increasing area will be described below with reference to FIG. 31, which is a graph showing detection areas of an image to be detected.

Figure 31:
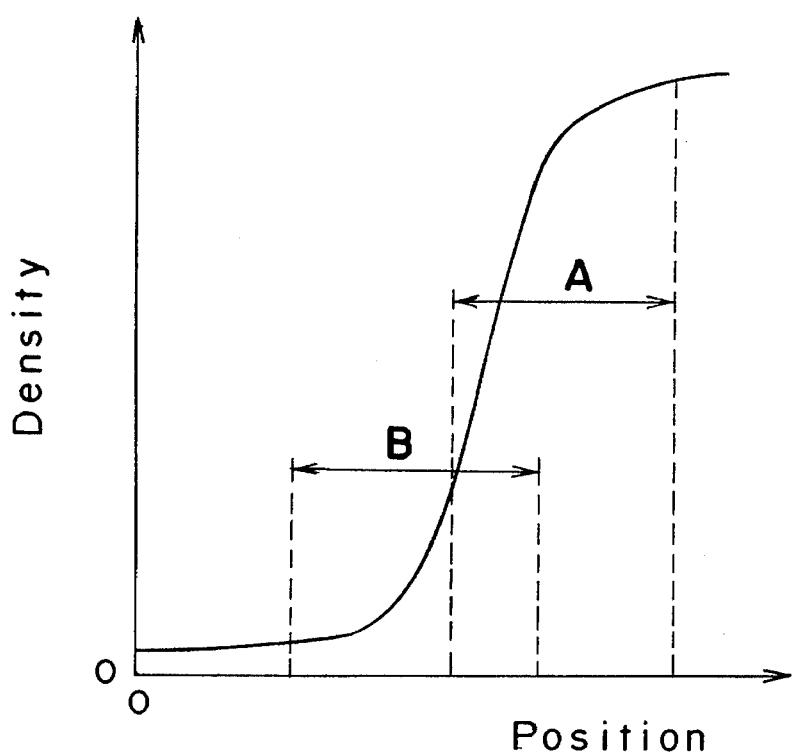
FIG. 31 is a graph showing detection areas of an image to be detected.

Referring to FIG. 31, a density curve shows a change from a low density area to a high density area, and an image located in the high density area is a black character in this case. An image area A having a density which ranges from a middle density to a relatively high density is a maximum gray density area, where the image thereof is to be reproduced so as to have a maximum gray density. An image area B having density, which ranges from a relatively low density to a high density-lower than the above relatively high density of the image area A, is an achromatic color area where the image thereof is to be reproduced with an achromatic color, or an edge emphasis increasing area where the image thereof is to be reproduced so as to have an edge emphasis amount larger than that of the other areas. If it is judged that an inputted image signal is an achromatic color signal, it is judged that the image area B is an achromatic color area. Namely, edges of black characters of a document image, when a piece of paper on which the document image is formed is colored, are detected as the edge emphasis increasing area in the present preferred embodiment.

FIG. 32 is a schematic block diagram showing a judgment process circuit 58 shown in FIG. 4b.

Referring to FIG. 32, the judgment process circuit 58 comprises a binarizing circuit 400, two selectors 401 and 402, and an OR gate 403. The binarizing circuit 400 binarizes the monochromatic signal Et for which the edge emphasis process has been performed, using a predetermined binarizing method which is well known to those skilled in the art, and outputs a binary monochromatic signal 404 to the selector 401.

When the achromatic color area detection signal Na which is inputted to the selection signal input terminal SA of the selector 401 has the high level, the selector 401 selects the binary monochromatic signal 404, and outputs it to the selector 402. On the other hand, when the achromatic color area detection signal Na has the low level, the selector 401 selects the monochromatic signal Et for which the edge emphasis process has been performed, and outputs it to the selector 402.

When the maximum gray density area detection signal Ba which is inputted to the selection signal input terminal SA of the selector 402 has the high level, the selector 402 selects a maximum density data signal ffH, and outputs it as the signal Etp. On the other hand, when the maximum gray density area detection signal Ba has the low level, the selector 402 selects the signal outputted from the selector 401, and outputs it as the signal Etp.

Further, the maximum gray density area detection signal Ba is inputted to the first input terminal of the OR gate 403, and the achromatic color area detection signal Na is inputted to the second input terminal thereof. The OR gate 403 calculates the logical sum of the above inputted signals, and outputs the selection signal t having a level of the logical sum thereof, which represents an area where the image thereof is to be reproduced with only black toner.

In the judgment process circuit 58 shown in FIG. 32, the selector 402 may be omitted, and the selection signal t outputted from the OR gate 403 may be inputted to the selection signal input terminal SA of the selector 401 because of the following reason. Since an image area which is judged as a maximum gray density area has a relatively high density, the signal outputted from the binarizing circuit 400 has a signal having the maximum gray density.

Figure 33:
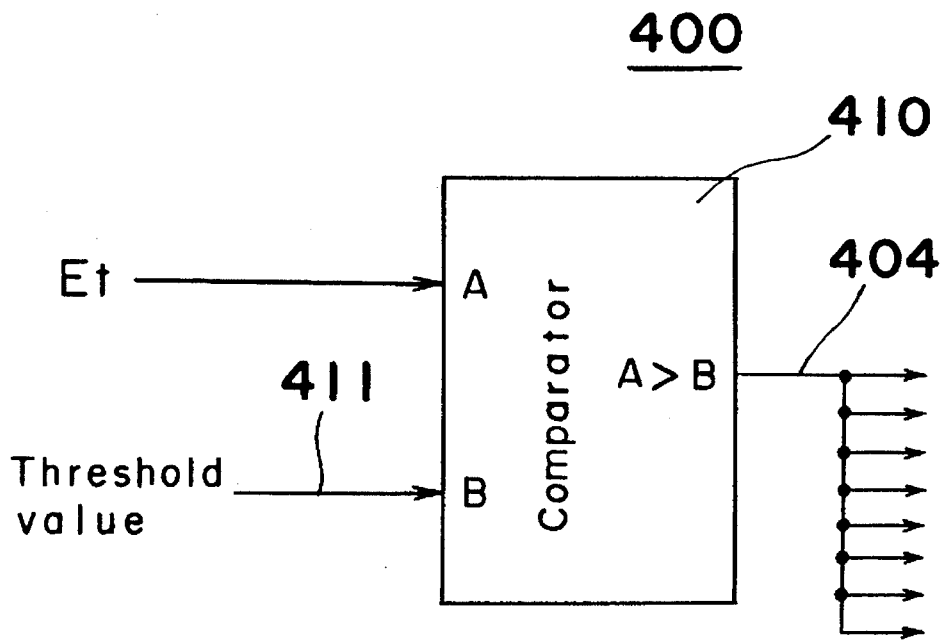
FIG. 33 is a schematic block diagram showing a binarizing circuit of a first preferred embodiment which is shown in FIG. 32.

FIG. 33 is a schematic block diagram showing the binarizing circuit 400 of a first preferred embodiment which is shown in FIG. 32.

Referring to FIG. 33, the binarizing circuit 400 comprises a comparator 410 for comparing the level of the monochromatic signal Et for which the edge emphasis process has been performed with a predetermined threshold value of a signal outputted from the controller 40 for controlling the digital copying machine. If the level of the monochromatic signal Et is larger than the above-mentioned threshold value, the comparator 410 outputs a high level signal 404. Otherwise, the comparator 410 outputs a low level signal 404. The signal 404 outputted from the comparator 410 is converted into a signal of eight bits which is either 00H or ffH.

Figure 34:
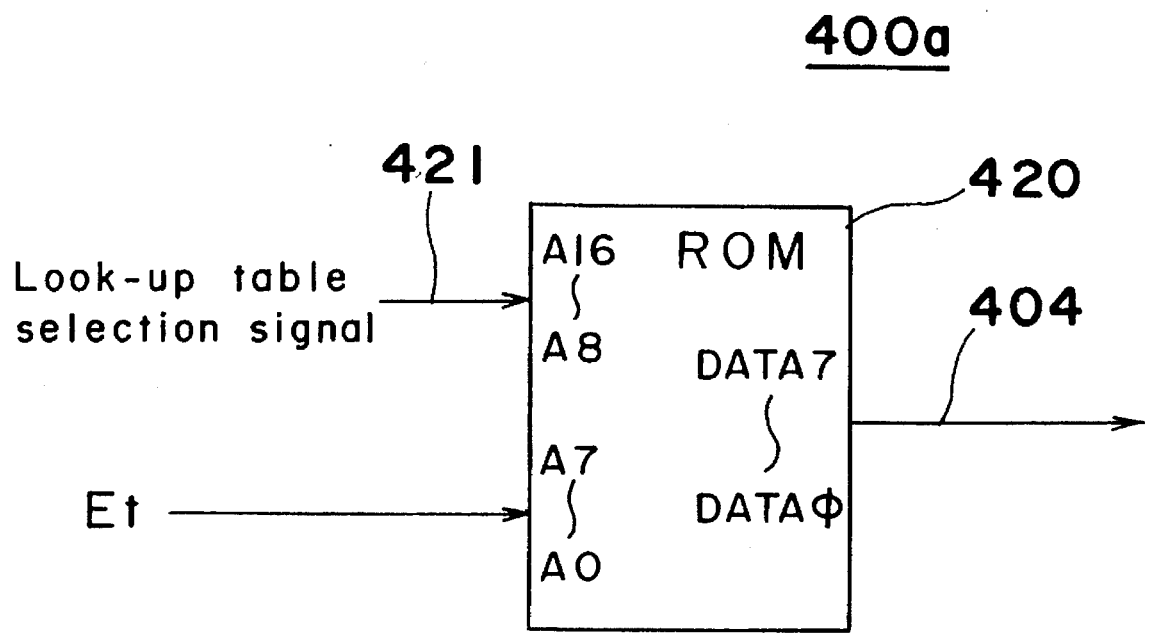
FIG. 34 is a schematic block diagram showing a binarizing circuit of a second preferred embodiment shown in FIG. 32.

FIG. 34 is a schematic block diagram showing the binarizing circuit 400a of a second preferred embodiment.

Referring to FIG. 34, the binarizing circuit 400a comprises a ROM 420 for storing binarizing conversion data of eight kinds of look-up tables therein. The monochromatic signal Et of eight bits for which the edge emphasis process has been performed is inputted to the address terminals A0 to A7 of the ROM 420, and a look-up table selection signal 421 of eight bits which is outputted from the controller 40 for controlling the digital copying machine is inputted to the address terminals A8 to A16 so as to select one of the above-mentioned look-up tables. The monochromatic signal Et is converted into the signal 404 by the ROM 420, and the signal 404 of eight bits is outputted from the data terminals DATA0 to DATA7. It is to be noted that the signal 404 is either 00H or ffH.

Figure 35:
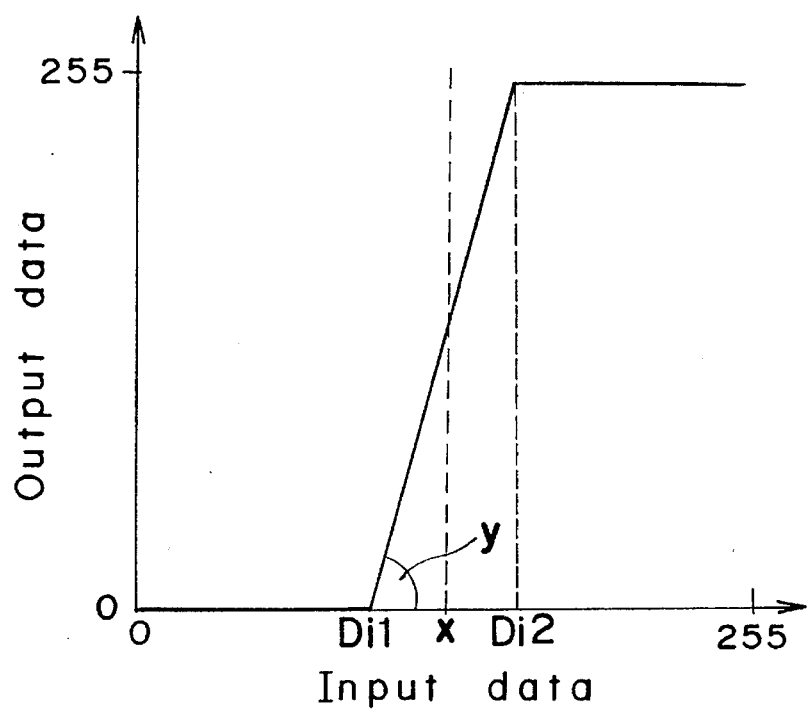
FIG. 35 is a graph showing data of a look-up table which are stored in a ROM of the binarizing circuit shown in FIG. 34.

FIG. 35 is a graph showing binarizing conversion data of a look-up table which are stored in the ROM 420 of the binarizing circuit 400a shown in FIG. 34.

In the binarizing conversion characteristic curve shown in FIG. 35, when the monochromatic signal Et is smaller than Di1, the level of the output signal 404 becomes zero. When the monochromatic signal Et is equal to or larger than Di1 and is equal to or smaller than Di2, the output signal 404 increases linearly in direct proportion to the inputted monochromatic signal Et. When the monochromatic signal Et is larger than Di2, the level of the signal 404 becomes 255.

If an angle y at a point at which the linearly increasing straight line of the binarizing characteristic crosses the axis of the input data is set at 90°, the binarizing circuit 400a becomes a binarizing circuit having a threshold value x. Further, if the angle y is set at a value larger than about 70° and smaller than 90°, a steep contrast conversion is performed. This steep contrast conversion is referred to as a pseudo binarizing process having a threshold value x.

Furthermore, in the case that the angle y is set at a value larger than about 80° and smaller than 90°, when an enlargement process is performed by the zooming circuit 50 shown in FIG. 4b, there may occur a jaggy in which edges of a reproduced image are jagged. In order to prevent the jaggy, the angle y is set at a smaller value depending on the enlargement factor of the enlargement process. Plural look-up tables respectively having different angles y and different threshold values x are preferably stored in the ROM 420, and then, a suitable look-up table is selected among them. In stead of the ROM 420, there may be used a RAM. In this case, a suitable look-up table is down-loaded into the RAM from the controller 40 for controlling the digital copying machine. Further, in Stead of the binarizing conversion characteristic of the look-up table shown in FIG. 35 which is composed of folded lines, the binarizing conversion characteristic of the look-up table may be composed of a curve or curves.

Figure 36:
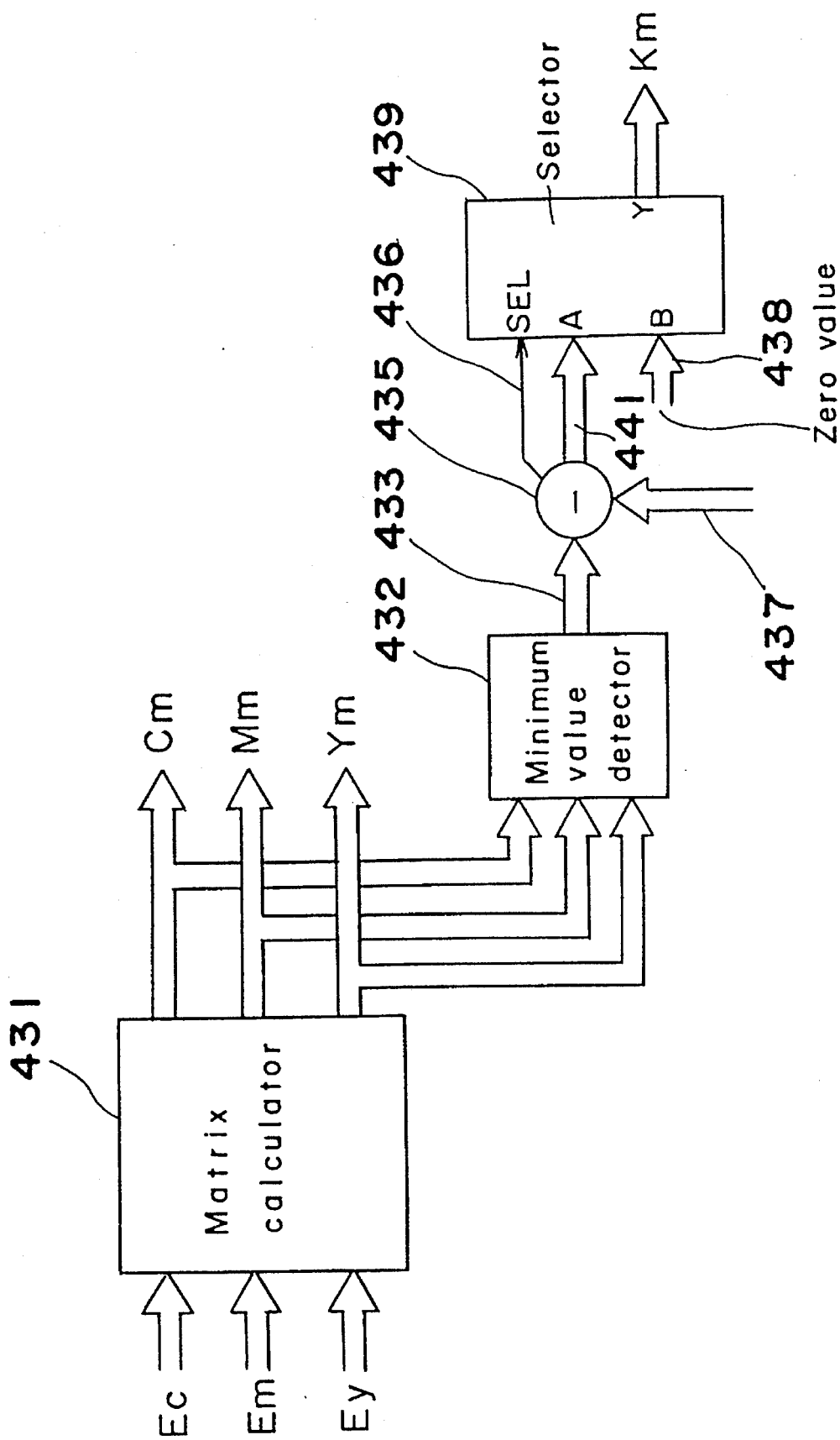
FIG. 36 is a schematic block diagram showing a masking circuit shown in FIG. 4b.

FIG. 36 is a schematic block diagram showing the masking circuit 29 shown in FIG. 4b.

Referring to FIG. 36, the masking circuit 29 comprises a matrix calculator 431, a minimum value detector 432, a subtracter 435, and a selector 439.

The matrix calculator 431 performs a color correction process or a masking process for the inputted image signals Ec, Em and Ey for which the edge emphasis process has been performed, by calculating image signals Cm, Mm and Ym using the following equation's (3) to (5).

$$Cm = a_{11} \cdot Ec + a_{12} \cdot Em + a_{13} \cdot Ey \qquad (3),$$

$$Mm = a_{21} \cdot Ec + a_{22} \cdot Em + a_{23} \cdot Ey \qquad (4)$$

and $$Ym = a_{31} \cdot Ec + a_{32} \cdot Em + a_{33} \cdot Ey \qquad (5),$$

where $a_{11}$, $a_{12}$, $a_{13}$, $a_{21}$, $a_{22}$, $a_{23}$, $a_{31}$, $a_{32}$ and $a_{33}$ are predetermined coefficients for the color correction.

The method of the above-mentioned masking process is the primary masking method which is well known to those skilled in the art.

The minimum value detector 432 detects the minimum value among the level of the image signals Cm, Mm and Ym for which the color correction process has been performed, and outputs an image signal 433 having a level of the detected minimum value to the subtracter 435.

The subtracter 435 subtracts a predetermined value of a signal 437 outputted from the controller 40 for controlling the digital copying machine, from the signal 433 outputted from the minimum value detector 432, and outputs a signal 441 having a level of the subtraction result to the input terminal A of the selector 439. Further, when the level of the output signal 441 becomes a negative value, the subtracter 435 outputs a high level sign signal 436 to the selection signal input terminal SEL of the selector 439. Otherwise, the subtracter 435 outputs a low level sign signal 436 thereto.

The selector 439 selects one of the image signal 441 outputted from the subtracter 435 and a signal 438 having a level of zero according to the sign signal outputted from the subtracter 435, and outputs the selected signal as a black component signal Km. Namely, when the sign signal 436 has the high level, the selector 439 outputs the black component signal Km having a level of zero. Otherwise, the selector 439 outputs the black component signal Km having a level of the signal 441.

In the present preferred embodiment, the above-mentioned threshold value of the signal 137 is called the skeleton level, and a method of generating the black component is the skeleton black method which is well known to those skilled in the art.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A digital color copying machine comprising:
   a monochromatic signal generator, said generator generating a monochromatic signal in response to inputted plural color signals obtained by reading a color document image;

an edge emphasizer, said edge emphasizer emphasizing edge components of said color signals with a predetermined edge emphasis amount, and outputting an edge emphasis image signal;

a digitizer, said digitizer digitizing said monochromatic signal and outputting a binary signal of said monochromatic signal;

a first area detector, said first area detector detecting a first image area comprising an inner area of black characters other than edges of said black characters, said black characters being included in a color document image and said black characters being printed in black in response to said inputted plural color signals;

a second area detector, said second area detector detecting a second image area where there are edges of said black characters of said color document image in response to said inputted plural color signals;

a third area detector, said third area detector detecting a third image area where there are color characters other than said black characters in response to said inputted plural color signals;

a first reproducer, said first reproducer reproducing, in response to said binary signal, said document image included in said first image area detected by said first area detector on a recording medium with only black toner;

a second reproducer, said second reproducer reproducing, in response to said binary signal, said color document image included in said second image area detected by said second area detector on said recording medium with only black toner; and a third reproducer, said third reproducer reproducing, in response to said binary signal, said color document image included in said third image area detected by said third area detector on said recording medium with cyan toner, yellow toner, magenta toner and black toner, after emphasizing edge components of said color signals with an edge emphasis amount larger than that of the other areas of said document image by said edge emphasizer.

2. The digital color copying machine as claimed in claim 1;

wherein said monochromatic signal generator combines said inputted plural color signals and outputs said monochromatic signal corresponding to one luminance or density of said inputted plural color signals.

3. The digital color copying machine as claimed in claim 1;

wherein said first area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

4. The digital color copying machine as claimed in claim 1;

wherein said second area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

5. The digital color copying machine as claimed in claim 1;

wherein said third area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

6. A digital color copying machine comprising:

a monochromatic signal generator, said generator generating a monochromatic signal in response to inputted plural color signals obtained by reading a color document image;

an edge emphasizer, said edge emphasizer emphasizing edge components of said color signals with a predetermined edge emphasis amount, and outputting an edge emphasis image signal;

a pseudo digitizer, said pseudo digitizer generating a pseudo binary signal by steepening the contrast of said monochromatic signal;

a first area detector, said first area detector detecting a first image area comprising an inner area of black characters other than edges of said black characters, said black characters being included in a color document image and said black characters being printed in black in response to said inputted plural color signals;

a second area detector, said second area detector detecting a second image are where there are edges of said black characters of said color document image in response to said inputted plural color signals;

a third area detector, said third area detector detecting a third image area where there are color characters other than said black characters in response to said inputted plural color signals;

a first reproducer, said first reproducer reproducing, in response to said pseudo-binary signal, said color document image included in said first image area detected by said first area detector on a recording medium with only black toner in response to said pseudo binary signal;

a second reproducer, said second reproducer reproducing, is response to said pseudo-binary signal, said color document image included in said second image area detected by said second area detector on said recording medium with only black toner; and a third reproducer, said third reproducer reproducing, in response to said emphasis image signal, said color document image included in said third image area detected by said third area detector on said recording medium with cyan toner, yellow toner, magenta toner and black toner, after emphasizing edge components of said color signals with an edge emphasis amount larger than that of the other areas of said document image by said edge emphasizer.

7. The digital color copying machine as claimed in claim 6;

wherein said monochromatic signal generator combines said inputted plural color signals and outputs said monochromatic signal corresponding to one of a luminance and a density of said inputted plural color signals.

8. The digital color copying machine as claimed in claim 6;

wherein said first area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

9. The digital color copying machine as claimed in claim 6;

wherein said second area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

10. The digital color copying machine as claimed in claim 6;

wherein said third area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

11. A digital color copying machine comprising:

a monochromatic signal generator, said generator generating a monochromatic signal in response to inputted plural color signals obtained by reading a color document image;

an edge emphasizer, said edge emphasizer emphasizing edge components of said color signals with a predetermined edge emphasis amount, and outputting an edge emphasis image signal;

a zoomer, said zoomer performing a zooming process for said edge emphasis image signal with a predetermined zooming ratio and outputting a zoomed image signal;

a pseudo digitizer, said pseudo digitizer generating a pseudo binary signal by steepening the contrast of said monochromatic signal with a contrast conversion characteristic determined according to said zooming ratio;

a first area detector, said first area detector detecting a first image area comprising an inner area of black characters other than edges of said black characters, said black characters being included in a color document image and said black characters being printed in black in response to said inputted plural color signals;

a second area detector, said second area detector detecting a second image area where there are edges of said black characters of said color document image in response to said inputted plural color signals;

a third area detector, said third are detector detecting a third image area where there are color characters other than said black characters in response to said inputted plural color signals;

a first reproducer, said first reproducer reproducing, in response to said pseudo binary signal, said color document image included in said first image area detected by said first area detector on a recording medium with only black toner;

a second reproducer, said second reproducer reproducing, in response to said pseudo binary signal, said color document image included in said second image area detected by said second area detector on said recording medium with only black toner;

a third reproducer, said third reproducer reproducing, in response to said zoomed image signal, said color document image included in said third image area detected by said third area detector on said recording medium with cyan toner, yellow toner, magenta toner and black toner, after emphasizing edge components of said color signals with an edge emphasis amount larger than that of the other areas of said document image by said edge emphasizer, and performing said zooming process for said edge emphasis signal by said zoomer.

12. The digital color copying machine as claimed in claim 11;

wherein said monochromatic signal generator combines said inputted plural color signals and outputs said monochromatic signal corresponding to one of a luminance and a density of said inputted plural color signals.

13. The digital color copying machine as claimed in claim 11;

wherein said first area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

14. The digital color copying machine as claimed in claim 11;

wherein said second area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

15. The digital color copying machine as claimed in claim 11;

wherein said third area detector comprises:

a monochromatic signal generator for generating a monochromatic signal in response to said inputted plural color signals;

an achromatic color detector, said achromatic color detector detecting whether or not said color document image is an achromatic color in response to said inputted plural color signals, and said achromatic detector outputting a first judgment signal when said color document image is an achromatic color;

a first windowing processor, said first windowing processor determining whether or not there is an edge component by scanning said monochromatic signal within a first pixel window composed of Na×Na pixels in a matrix form wherein Na is a natural number, and said first windowing processor outputting a second judgment signal when there is an edge component, said first pixel window having a specified pixel;

a second windowing processor, said second windowing processor determining whether or not there is an edge component by scanning said monochromatic signal within a second pixel window composed of Nb×Nb pixels is a matrix form wherein Nb is a natural number smaller than said natural number Na, and said second windowing processor outputting a third judgement signal when there is an edge component, said second pixel window having said specified pixel;

a vicinity edge detector, said vicinity edge detector detecting whether or not an edge component of said specified pixel and edge components of pixels located in the vicinity of said specified pixel are detected by said second windowing processor, and said vicinity edge detector outputting a fourth judgment signal when said edge components are detected; and a signal generator, said signal generator generating a signal for representing said first image area, when said first judgement signal with respect to said specified pixel is outputted from said achromatic color detector, said second judgement signal with respect to said specified pixel is outputted from said first windowing processor, and said fourth judgement signal with respect to said specified pixel is outputted from said vicinity edge detector.

* * * * *